(12) United States Patent
Kundu et al.

(10) Patent No.: US 8,005,294 B2
(45) Date of Patent: Aug. 23, 2011

(54) CURSIVE CHARACTER HANDWRITING RECOGNITION SYSTEM AND METHOD

(75) Inventors: Amlan Kundu, Ashburn, VA (US); Linda C. Van Guilder, Oakton, VA (US); Tom Hines, Rockville, MD (US); Ben Huyck, Ashburn, VA (US); Jon Phillips, Arlington, VA (US)

(73) Assignee: The MITRE Corporation, McLean, VA (US)

(*) Notice: Subject to any disclaimer, the term of this patent is extended or adjusted under 35 U.S.C. 154(b) by 953 days.

(21) Appl. No.: 11/605,415

(22) Filed: Nov. 29, 2006

(65) Prior Publication Data

US 2008/0123940 A1     May 29, 2008

(51) Int. Cl.
*G06K 9/62* (2006.01)

(52) U.S. Cl. ........................................ 382/159; 382/186
(58) Field of Classification Search .................. 382/186, 382/181, 115
See application file for complete search history.

(56) References Cited

OTHER PUBLICATIONS

Lorigo et al : "Segmentation and pre-recognition of Arabic handwriting", Proc. ICDAR'5, IEEE, 2005.*
M. -Y. Chen, A. Kundu and J. Zhou, "Off-line Handwritten Word Recognition Using a Hidden Markov Model Type Stochastic Network," IEEE Trans. on PAMI, vol. 16, 5, 481-496, May 1994.
M. -Y. Chen, A. Kundu and S. N. Srihari, "Variable Duration HMM and Morphological Segmentation for Handwritten Word Recognition," IEEE Trans. on Image Proc., vol. 4, 12, 1675-1688, Dec. 1995.
A. Kundu, Y. He and M. -Y. Chen, "Alternatives to Variable Duration HMM in Handwritten Word Recognition," IEEE Trans. on PAMI, vol. 20, 11, 1275-1280, 1998.
A. Kundu, P. Bahl and Y. He, "Recognition of Handwritten word: First and Second Order Hidden Markov Model Based approach," Pattern Recognition, vol. 22, No. 3, 283-297, 1989.
Almuallim, H. and Yamaguchi, S., "A Method of Recognition of Arabic Cursive Handwriting," IEEE Transactions on Pattern Analysis and Machine Intelligence (PAMI), vol. 9, 1987.
Khorsheed, M.S. and W.F. Clocksin, "Off-line Arabic word recognition using a Hidden Markov Model," In Statistical Methods for Image Processing—A Satellite Conference of the 52-nd ISI Session, Uppsala., 1999.
Kanoun, S., Ennaji, A., Lecourtier, Y. and Alimi, A. M. "Linguistic Integration Information in the AABTAS Arabic Text Analysis System," Proc. of International Workshop on Frontiers in Handwriting Recognition (IWFHR), vol. 8, pp. 389-394, Aug. 2002.

(Continued)

*Primary Examiner* — Samir A Ahmed
*Assistant Examiner* — Ruiping Li
(74) *Attorney, Agent, or Firm* — Sterne, Kessler, Goldstein & Fox, P.L.L.C.

(57) ABSTRACT

A cursive character handwriting recognition system includes image processing means for processing an image of a handwritten word of one or more characters and classification means for determining an optimal string of one or more characters as composing the imaged word. The processing means segments the characters such that each character is made up of one or more segments and determines a sequence of the segments using an over-segmentation-relabeling algorithm. The system also includes feature extraction means for deriving a feature vector to represent feature information of one segment or a combination of several consecutive segments. The over-segmentation-relabeling algorithm places certain segments considered as diacritics or small segments so as to immediately precede or follow a segment of the associated main character body. Additionally, the system also includes classification means that processes each string of segments and outputs a number of optimal strings which could be matched against a given lexicon.

42 Claims, 12 Drawing Sheets

OTHER PUBLICATIONS

Abuhaiba, Holt, M. and Datta, S., "Processing of Binary Images of Handwritten Cursive Arabic Characters," IEEE Transactions on Pattern Analysis and Machine Intelligence (PAMI), vol. 16, No. 6, Jun. 1994.

"Seventh International Conference Document Analysis and Recognition", Aug. 3 to 6, 2003.

ICDAR 2005 Arabic Handwriting Recognition Competition, V. Märgner, M. Pechwitz, H. El Abed.

A. Kundu and L. Van Guilder, "Quick International Character Recognition (QUICK)", Powerpoint Presentation, Mitre Technology Symposium, Apr. 2005.

L. Van Guilder, "Improved Foreign Language OCR", Powerpoint Presentation, Mitre Technology Symposium, Apr. 2004.

Rabiner, L.R., "A tutorial on hidden Markov model and selected applications in speech processing," Proceedings of IEEE 77(2):257-289 (1989).

* cited by examiner

SPSB = segment preceding segment below
SFSA = segment following segment above
⊗ = segment in $X_1$ image
▢ = segment in $X_2$ image SFSB = segment following segment below
SPSA = segment preceding segment above
🥧 = segment in $X_1$ image
🥧 = segment in $X_2$ image

CURSIVE CHARACTER HANDWRITING RECOGNITION SYSTEM AND METHOD

BACKGROUND OF THE INVENTION

1. Field of the Invention

The present invention relates to handwriting recognition systems. More particularly, the present invention relates to a handwriting recognition system and method for unconstrained handwritten cursive words, either created on-line (words written directly on a touch computer screen) or off-line (words written on other media and the word image is then captured for use in the recognition system).

2. Background Art

Unconstrained handwritten words including, in full or part, cursively written characters presents a challenge for handwritten word recognition (HWR) systems because of the variation in writing styles and the difficulty in determining the boundaries between the individual characters. HWR systems generally include an image processing stage, a feature extraction stage, and a classification stage. The image processing stage may generally include image capture for on-line and off-line written words, noise reduction, skew correction, slant normalization and/or segmentation. Generally, there are two information sources associated with the written text: shape information and linguistic information. The goal of the feature extraction stage is to extract or compute representative features of individual characters, a group of consecutive characters, and/or the word. The classification stage usually occurs after the HWR system has been trained on sets of known data (e.g., database of known handwritten words/characters coupled with linguistics or dictionary knowledge) in order to develop the parameters which are used in classifying the imaged word.

Many HWR systems follow a segmentation procedure for segmenting the given word image in order to determine the individual characters using mathematical modeling in the classification stage. An over-segmentation procedure based on morphology and linguistic information is used to translate a 2-D word image into 1-D sequence of sub-character symbols. The imaged word is segmented generously to ensure that genuine segmentation points (i.e., correct segmentation points of cursive character handwritten words) are captured as a subset of all segmentation points. For example, and for illustration purposes only, FIG. 6A shows an image of an Arabic handwritten word, and FIG. 6B illustrates a segmentation of this imaged word segmented to consist of a set of twelve segmentation points. Four are true segmentation points while the other eight are false segmentation points. In this segmentation, small segments or diacritics belonging to a main character body were lumped together as one segment. Accordingly, for illustration in FIG. 6B, similar hatch marks fill these small segments. The sum of true and false segmentation points results in "over-segmentation" of the imaged word.

Features are selected to represent the shape information of character and sub-character symbols, and the sequence of symbols is modeled by a recognition algorithm. Recognition algorithms include Hidden Markov Model (HMM), which has been used in many HWR systems to recognize handprinted words, but many of these systems have not made any connection of modeling over-segmentation of characters to variable duration states of HMM. Instead, these systems have followed the traditional path of modeling each character by an HMM, and then concatenating character HMMs into a word. By contrast, in a Variable Duration Hidden Markov Model (VDHMM), different images of like characters may be divided into one or more segments, and a probability is obtained that a particular number of combined consecutive segments correctly defines the character. In this context, the variable duration state is used to take care of the segmentation ambiguity among the consecutive characters. Consequently, determining the order of the segments becomes important because, if incorrect, no combination of consecutive segments will yield the true character.

In a given language, diacritics are part of characters and provide features that may be taken into account for character and word recognition. Certain languages, such as Arabic, for example, are not only written as script, but also employ many diacritics. These diacritics should be considered in order to improve the accuracy of the character and word recognition. Moreover, existing HWR systems developed for one language may not be applied in a straightforward manner to another language having different characters in the alphabet and, therefore, needing different representative features of the characters. For example, Arabic presents a particular challenge for HWR systems since character shape is context sensitive and all orthography is cursive. Up to four forms of the same character (isolated, initial, middle and final) exist in Arabic. Further, because of the difficulty associated with segmentation of handwritten text, direct word recognition systems which bypass segmentation and individual character recognition have been considered; these systems, however, work for a fixed lexicon and can not be ported to changing applications.

A VDHMM based HWR system has been proposed in Chen, M.-Y., et al., "Variable duration hidden Markov model and morphological segmentation for handwritten word recognition," IEEE Trans. on Image Processing 4(12):1675-1687 (1995)(referred to hereinafter as "Ref1"), incorporated herein by reference in its entirety. However, the HWR system developed in Ref1, which was proposed for English handwriting, does not employ a segmentation procedure which recognizes diacritics and other accents or small segments as being associated with its consecutive main character body. Rather, the segmentation procedure may either eliminate or label the diacritics and small segments as being at the beginning or end of a segment sequence of the word or of a group of cursively connected characters of the word (such as when the handwritten word includes a break between cursively connected characters). As a result, it becomes less likely that combining a given number of consecutive segments will yield a correct segment sequence including both the character main body and its associated diacritic/small segment. Furthermore, in many systems, the number of features can vary from 20 to 60; many of these features are discrete with 2 to 4 possible values. In Ref1, all features, irrespective of their discrete nature, are modeled with continuous density.

What is needed, therefore, is a HWR system and method for cursive character handwriting that employs an algorithm that determines a segment sequence in which diacritics and small segments are placed next to their respective main character bodies. Additionally, what is needed is a proper distribution modeling of individual features, with continuous distribution modeling of continuous features, and discrete modeling of discrete features. The present invention satisfies these and other needs such as a comprehensive string matching post-processing algorithm based on empirically derived character confusion information and linguistic constraint, and provides further related advantages, as will be made apparent by the description of the present invention that follows.

BRIEF SUMMARY OF THE INVENTION

A system and method for recognizing cursive character handwritten words are presented. The system includes image processing means for processing an image of a handwritten word of one or more characters, including segmenting the imaged word into a finite number of segments and determining a sequence of the segments using an over-segmentation-relabeling algorithm, feature extraction means for deriving a feature vector to represent feature information of one segment or a combination of several consecutive segments; classification means for determining an optimal string of one or more characters as composing the imaged word, and string matching, i.e., post-processing, means that matches the optimal string of characters to valid words in the lexicon using applicable cost metric. The processing means segments the characters such that each character is made up of one or more segments.

A method for recognizing unconstrained cursive handwritten words includes the steps of processing an image of a handwritten word of one or more characters, extracting feature information of one segment or a combination of several consecutive segments, repeating the extracting step until feature information from all segments or combinations thereof have been extracted, and classifying the imaged word as having a string of one or more characters using the extracted feature information.

A method for training an unconstrained cursive character handwritten word recognition system is also presented. The method includes the steps of processing a corpus of handwritten word images, each imaged word having one or more characters, extracting feature information of individual characters of the imaged words, estimating multivariate probability distribution parameters associated with each distinct character so as to allow a statistical measure, called symbol probability during the recognition phase, that given feature information is indicative of a distinct character, and estimating state duration probabilities associated with each distinct character, wherein a state duration probability of a given distinct character represents a probability that a segmented image of the given character will have a duration of a defined number of segments.

In the processing step for either the training method or the recognition method and system therefore, each imaged word is segmented into a set of one or more segments and a sequence of segments is determined using an over-segmentation-relabeling algorithm. The over-segmentation-relabeling algorithm places certain segments considered as diacritics or small segments so as to immediately precede or follow a segment of the associated main character body. In one embodiment, the over-segmentation-relabeling algorithm includes characterizing segments as either situated segments or unsituated segments, wherein situated segments include first and last segments and segments having an X-coordinate or Y-coordinate coverage that exceeds a threshold value, and wherein unsituated segments are segments not characterized as situated segments, and placing each unsituated segment having a situated segment above or below so as to either immediately precede or follow the situated segment in the sequence of segments.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention. In the drawings, like reference numbers, letters, or renderings indicate identical or functionally similar elements.

DETAILED DESCRIPTION OF THE INVENTION

Overall System

Figure 1:
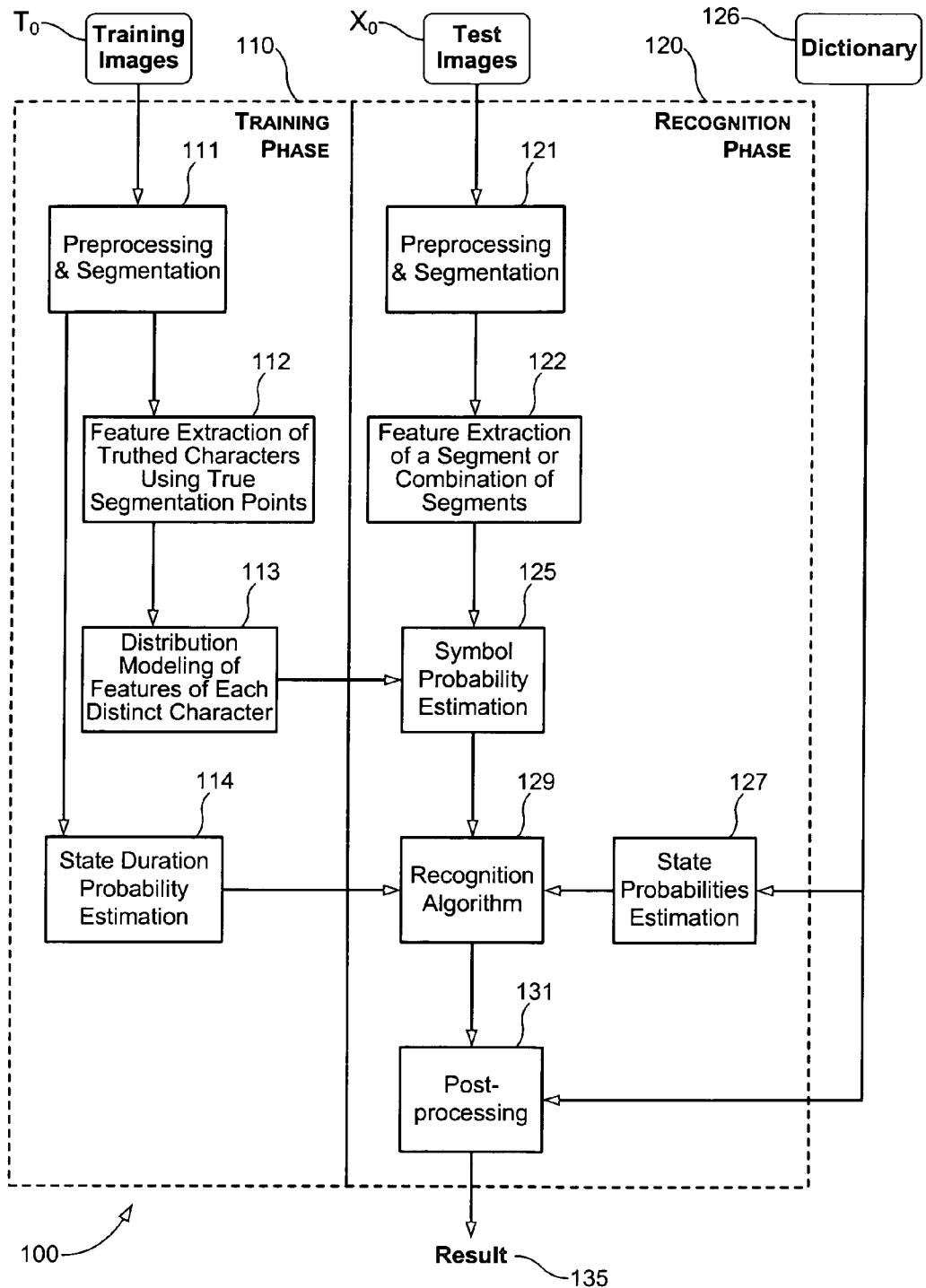
FIG. 1 is a flowchart illustrating an exemplary embodiment of a HWR process according to the present invention.

FIG. 1 shows a process of an HWR system 100, according to an embodiment of the present invention. HWR system 100 may be used for both off-line and on-line handwritten words, such as word images created and then imported into the HWR system or a word image created directly on a tablet touch screen interfacing with the HWR system, respectively. System 100 will be described as applied to off-line handwritten Arabic, but it should be understood that this is done for illustrative purposes only. A person skilled in the pertinent art will recognize the process and system described herein may be applied to other languages (such as, for example, Tamil, Bengali, and Pashtu), on-line or off-line, without departing from the spirit and scope of the present invention. Further, while specific configurations and arrangements are discussed, it should be understood that this is also done for illustrative purposes only. A person skilled in the pertinent art will recognize that other configurations and arrangements can be used without departing from the spirit and scope of the present invention.

HWR system 100 may involve a training phase 110 in addition to a recognition phase 120. Training phase 110 provides system 100 with word recognition capability for handwritten words images in a particular language. In particular, training phase 110 equips system 100 with later-described statistical model parameters and probabilities associated with each distinct character which are used to model and classify an imaged word in recognition phase 120. In an embodiment of system 100, all handwritten words are modeled by one Hidden Markov Model (HMM) where each distinct character is a state. By character it is meant a letter or symbol of an alphabet for a written language, and a "distinct character" as used herein refers to each distinct form of the characters of the alphabet. Thus, for example, the English alphabet has 26 distinct characters, or 52 distinct characters if upper and lower cases are considered separately. Although Arabic has 28 different characters, in one embodiment, it has a total of 123 distinct forms of these characters (up to 4 forms, corresponding to the isolated, initial, middle and final forms of each character plus a number of ligatures, i.e., joint character form, and accordingly, Arabic has 123 "distinct characters" in one embodiment). Therefore, the HMM as applied to Arabic has 123 states. Each state has a variable duration so that it can model a distinct character as made of a number of segments. In this context, the variable duration state is used to take care of the segmentation ambiguity among the consecutive characters.

During recognition phase 120, a segmentation algorithm segments each imaged word of one or more characters so that each character is composed of one or several consecutive elementary units called segments, which are divided by segmentation points. A later-described over-segmentation-relabeling algorithm determines a sequence of these segments, and the resulting sequence of segments is modeled using a Variable Duration Hidden Markov Model (VDHMM). In the VDHMM, various combinations of consecutive segments are observations. Thus, a series of segments leads to an observation sequence, and different combinations lead to different sequences. Each observation is then scored against trained models of distinct characters developed from "truthed characters," or characters extracted from imaged words during training phase 110, in which the identity of each character is known, and each observation is assigned a probability of belonging to each state. A recognition algorithm adapted to the VDHMM uses these probabilities in addition to linguistic knowledge reflected in later-described state probabilities to output an optimal string of one or more characters as composing the imaged word.

Training phase 110 and recognition phase 120 will now be described in greater detail below based on embodiment of system 100 as applied to the Arabic language. In training phase 110, a corpus of training images $T_0$ of handwritten Arabic word samples are processed in step 111, in which each image $T_0$ is captured and subjected to preprocessing and segmentation using a later-described over-segmentation-relabeling algorithm. Moreover, in step 111, the true segmentation points between characters are identified so that system 100 is trained on images of truthed characters. Image capture of off-line handwritten words may be achieved by means of a scanner, such as, for example, scanning an image at 300 dpi in black and white. Preprocessing may include modifying the captured image to remove noise (noise reduction) and correct skewing or slanting of characters in the word (slant normalization). In step 112, feature information of individual characters (i.e., the truthed characters) of imaged word $T_0$ is extracted. The selected features extracted are those considered to be descriptive characteristics of each distinct character and may be specifically tailored for particular written language. Thus, based on knowledge of the characteristics of the particular written language, a set of features may be selected or derived as being appropriate for the language. Further, it may be desirable to test whether the selected set of features yields accurate results in the classification stage of the HWR system. Thus, iterations between the training phase and the recognition phase may be desirable for initial optimization of the selected set of features used in the HWR system as applied to the particular language. More detailed description of the feature selection and representative features of Arabic words will be further described below. Feature information may be scaled in the range from 0-1 for each selected feature, and the scaled data string of the selected features extracted for a given character image may be compactly represented by a feature vector. A feature vector includes each of the selected features assigned with a scaled weight from 0-1 to represent the extent that a particular feature is present in the given character image. For example, where a given feature is strongly present in a character, feature is assigned a "1," and where a given feature is absent, the feature is assigned a "0" in the feature vector for that character image.

In step 113, for each distinct character, symbol probability parameters are estimated so as to allow symbol probabilities to be estimated in step 125 of later-described recognition phase 120. In one embodiment, estimation of symbol probability distribution parameters, needed to compute the symbol probability during recognition, includes calculating one or more representative feature vectors for each state (i.e., each distinct character) so as to provide one or more mean feature vectors for that state. For a given state, these representative feature vectors each correspond to a dominant writing style for the distinct character symbol/letter assigned as that state. These representative feature vectors may be calculated based on the collection of individual feature vectors for the character images of a like distinct character (e.g., individual feature vectors for each image of the Arabic letter, in its final form, that corresponds to diagraph "SH") that were extracted from the corpus of training images $T_0$. In one embodiment, a statistical distribution is derived for each dominant writing style of a distinct character, thereby providing parameters for a symbol probability distribution in step 125. Symbol probabilities give a statistical measure that a given feature vector (such as that extracted from test image $X_0$) is indicative of a distinct character. Thus, during training phase I 10, mathematical model parameters are constructed for each of the distinct characters of the chosen language for system 100. This allows estimation of the symbol probabilities in recognition phase 120 in which a given feature vector of an observation (composed one or more combined consecutive segments) is statistically compared against all feature vectors extracted during the training phase and, for each distinct character, a probability is estimated that the observation is an image of that distinct character. In other words, symbol probabilities give a statistical measure that a given feature vector (such as that extracted from test image $X_0$) is indicative of a distinct character. Symbol is what is observed. It is matched against all the character models created during training. The matching likelihood, a probability, is the symbol probability.

In essence, symbol probability distribution is distribution modeling of characters represented by feature vectors.

In step 114, for each distinct character (i.e., state), a state duration probability is estimated. As a result of the segmentation in step 111, each individual image of a like distinct character from the corpus of training images $T_O$ may be divided into one or more segments. Based on the collection of the segmentation results gathered from these individual images, the likelihood that an image of a distinct character will be segmented into a certain number of segments (i.e., segmented to have a certain 'duration') may be determined. For example, the ratio of the number individual images of a like distinct character that were divided into 2 segments against the total number of images of that character appearing in the corpus of training images $T_O$ provides a probability that another image of that distinct character will likewise be segmented into 2 segments. Each character is segmented in step 111 so as to consist of one or more finite number of segments.

In recognition phase 120, test images $X_O$, or images to be recognized using system 100, are processed in step 121, in a similar manner that training images $T_O$ may be processed in step 111 (i.e., an image $X_O$ (consisting of one or more characters) may be preprocessed and segmented using a later-described over-segmentation-relabeling algorithm). In step 122, feature information is extracted for one segment or a combination of several consecutive segments from the image $X_O$ processed in step 121. More particularly, in one embodiment, a feature vector is derived for each observation, i.e., for each image built of one or several consecutive segments merged together. For each particular image $X_O$, multiple observations are possible, and one observation for each possible combination of consecutive segments may be evaluated in step 122. An upper limit of total combined segments for an observation may also be defined. In one embodiment, the upper limit of combined segments is in a range of 2 to 7 segments. In another embodiment, the upper limit of combined segments is in a range of 3 to 6 segments. In another embodiment, an observation may consist of at most 4 segments. Correspondingly, the segmentation procedure in step 121, may be configured to segment the image so that each character is segmented into at most the same upper limit defined for the number of segments combined for an observation.

Step 129, in conjunction with steps 114, 125 and 127, provide a classification means for determining an optimal string of character(s) as composing the image $X_O$. In steps 114, 125 and 127, duration, symbol, and later-described state probabilities, respectively, are estimated. In general, state probabilities may include initial, transition, and last-state probabilities computed from a given dictionary 126, reflecting the likelihood that the imaged word begins with a one distinct character, transitions to a second distinct character (in one embodiment), and ends with the second distinct character, respectively. Thus, state transition is given by bigram probabilities. It should be noted that someone skilled in the art could also use this scheme to apply tri-gram probabilities, transition from one character to a second and third distinct characters in sequence. The cost of using tri-gram probabilities is much increased complexity both during training and recognition. The duration, symbol, and state probabilities are processed in a recognition algorithm in step 129 which outputs optimal character strings based on these probabilities. This determination of optimal strings are not guaranteed to be a true word, and therefore, a processing means can be used to further match these character strings to lexicon words for final word recognition. In one embodiment, system 100 includes a later-described post-processing step 131, in which given dictionary 126 may also be used to provide hypotheses of words (result 135) based on the output strings from the recognition algorithm in step 129. Alternatively, result 135 may be the optimal strings without further post-processing using given dictionary 126 (or other chosen dictionary). As mentioned above, in step 125, symbol probabilities are estimated for each of the feature vectors derived from the evaluated observations in step 122. Thus, for each observation (one or several combined consecutive segments of the particular test image $X_O$), the observation is assigned a probability of belonging to each state (i.e., for each distinct character, a probability that the observation is an image of that distinct character). Further, the symbol probability may be modeled using a continuous, continuous-discrete hybrid or a discrete distribution, as described in further detail below.

Over-Segmentation-Relabeling Algorithm

An algorithm for determining the sequence of segments in a given segmented word image is defined herein, and is be referred to throughout this description and appended claims as an "over-segmentation-relabeling algorithm." The over-segmentation-relabeling algorithm takes a word image segmented by a conventional segmentation algorithm and relabels certain segments considered as diacritics (or small segments) so as to immediately precede or follow a segment of the associated main character body.

For example, and not by way of limitation, a conventional word segmentation algorithm is described in Ref1 (hereinafter referred to as a "generic segmentation algorithm"). In general, after a series of pre-processing operations, an individual word image, i.e., an image that contains one word only, becomes a collection of black pixels against white background. The highly dense areas of black pixels are the main character bodies while connecting areas or strokes with very little density of black pixels are considered as locations of segmentation points. Segmentation criteria may include requiring that all touching characters must be split and no spurious segment is allowed, that is, no "null" state is allowed (for the definition of "null" state, see Chen, M.-Y., et al., 0"Off-line handwritten word recognition using a hidden Markov model type stochastic network," IEEE Trans. on PAMI 16(5):481-496 (1994), incorporated herein by reference in its entirety). In an embodiment herein, the segmentation criteria may further define an upper limit to the number of segments that each complete character can be segmented into. In one embodiment, each complete character can be segmented into at most between two to seven segments. In another embodiment, each complete character can be segmented into at most four parts. As discussed above, the number of segments that combine to compose an observation may likewise be limited by the same upper limit provided in the segmentation criteria.

For the generic word segmentation algorithm, some heuristics are usually applied to verify that segmentation points have been located. For instance, if two segmentation points are very close, one of them is assumed to be spurious, and the segmentation points are merged. After the segmentation points are located, the next step is to locate the first segmentation point. Usually, it is the left-most segmentation point for English and the right-most segmentation point for Arabic. Next, the sequence of segmentation points is determined, i.e., given all the segmentation points, what is the best order to follow. The final step is the verification of the last segmentation point. This step is usually required to reject any residual stroke or ligature that may show up at the end.

Figure 3A:
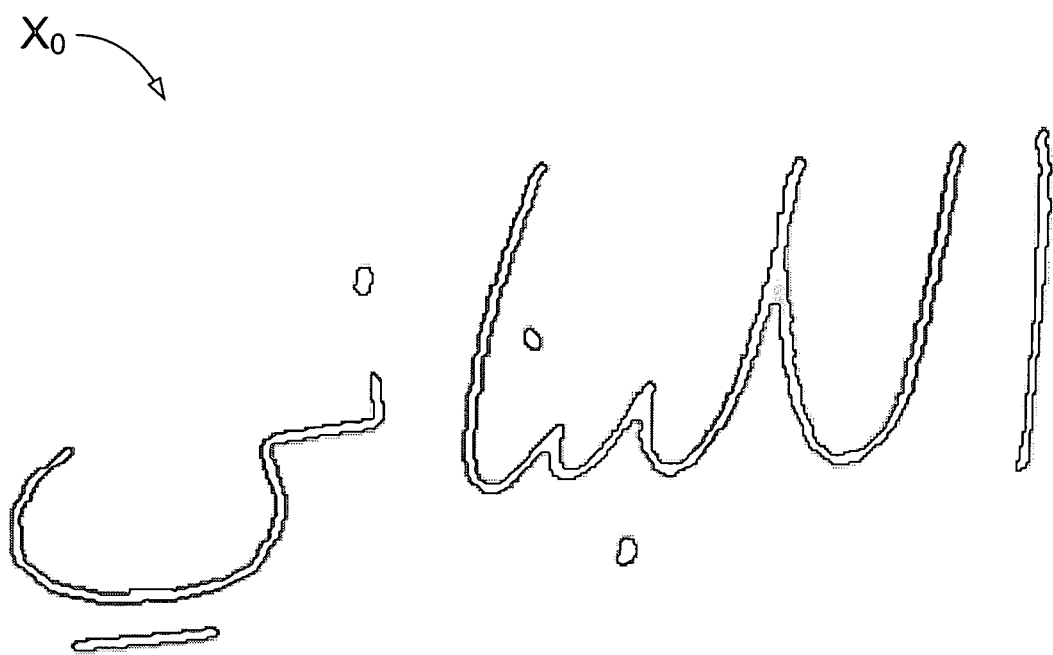
FIG. 3A is an image of a handwritten Arabic word.
Figure 3B:
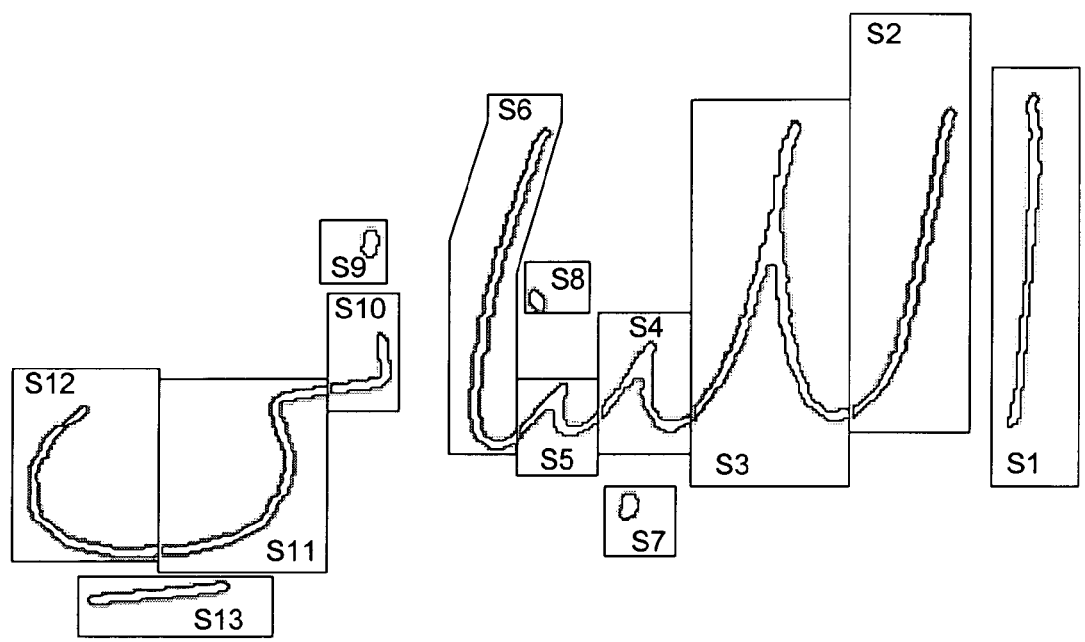
FIG. 3B is an image of the Arabic word shown in FIG. 3A with segmentation points located and the resulting segments sequenced according to an example generic segmentation algorithm.

This generic segmentation algorithm locates segmentation points, but sequences these segmentation points such that diacritics are placed at the beginning or end of cursively connected characters in their segment sequencing. For example, starting with an Arabic word image $X_0$ as shown in FIG. 3A, the generic algorithm segments image $X_0$ as shown in FIG. 3B, illustrating each segment "S" in a box for illustration purposes. Further, the generic algorithm provides the sequence of segments "S" in the order of 1 to 13, labeled respectively as S1 to S13, from right to left for Arabic. Thus, segments S7 and S8 are placed in the segment sequence so as to be at the end of cursively connected segments S2 to S6. However, S5 and S8 in fact make up the Arabic letter, in its medial form, that corresponds to diagraph "noon", and S4 and S7 in fact make up the Arabic letter, in its medial form, that corresponds to diagraph "ba". Because S8 is not placed in the segment sequence as a segment consecutive to the main character body (S5) of which it is a part, no observation (combination of segments) will form the correct character. That is, no observation will consist of S5+S8, and likewise, no observation will consist of S4+S7, although each of these segment combinations makes up the character. Therefore, it becomes unlikely that a VDHMM based HWR system relying on the generic segmentation algorithm would recognize the correct character because no combination of segments would result in the correct boundaries between characters, or the genuine segmentation points.

Figure 4A:
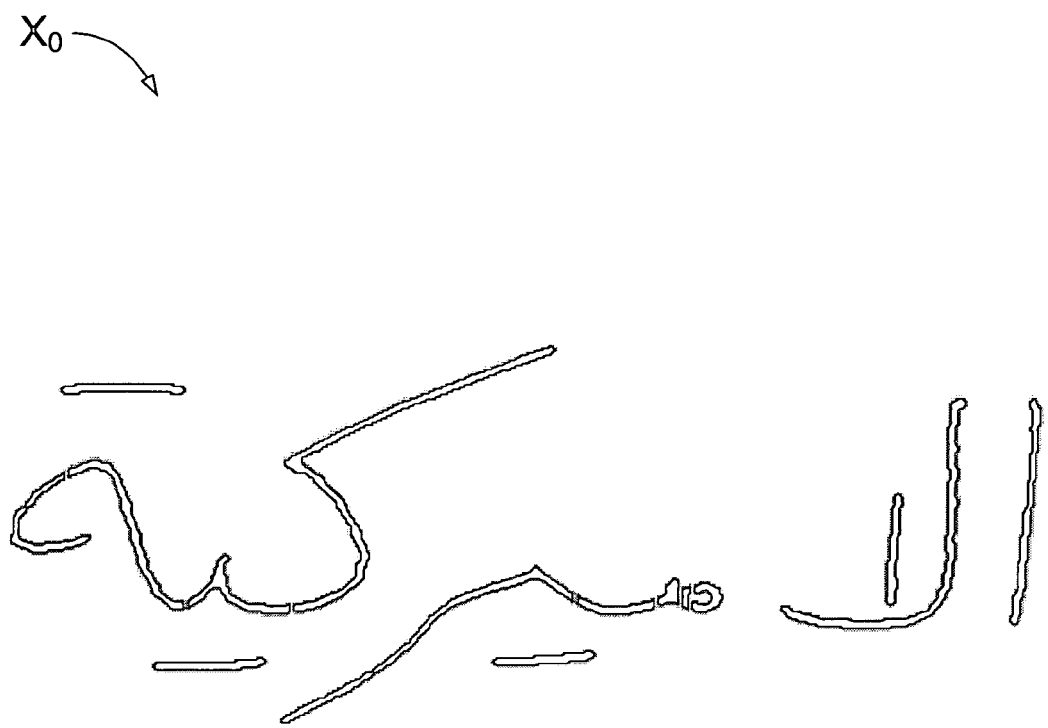
FIG. 4A is an image of another handwritten Arabic word.
Figure 4B:
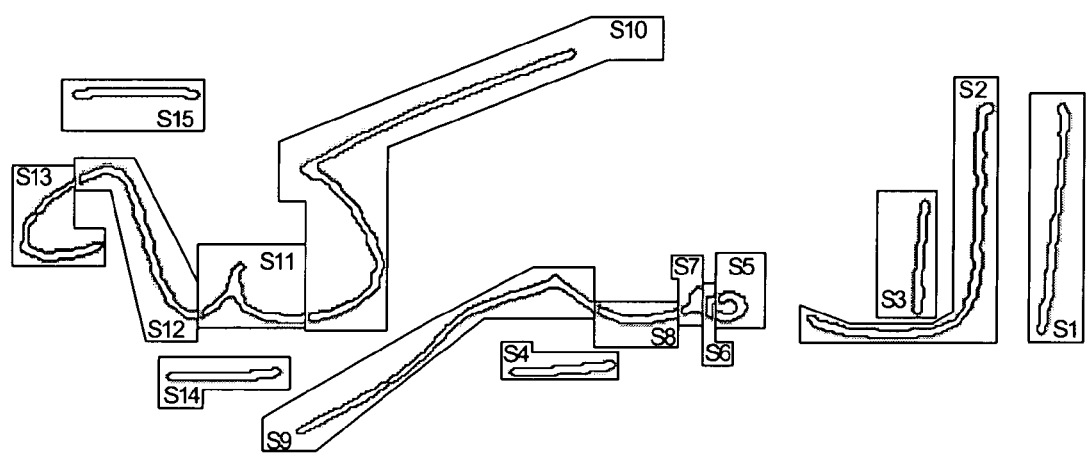
FIG. 4B is an image of the Arabic word shown in FIG. 4A with segmentation points located and the resulting segments sequenced according to an example generic segmentation algorithm.

FIG. 4B provides another example of an Arabic word image shown in FIG. 4A being processed using the generic segmentation algorithm that results in diacritics and small segments being removed from the segment(s) of their associated main character bodies. As shown in FIG. 4B, the generic segmentation algorithm places segment S14 so as to be after cursively connected segments S10 to S13 in the segment sequence. However, S14 is in fact associated with S11 (which form the Arabic letter, in its medial form, that corresponds to diagraph "ya"). Furthermore, S15 is in fact associated with S13 and S12 (which together form the Arabic letter, in its final form, that corresponds to diagraph "te marbuta"), but the displacement of S14 prevents S15 from following segments S12 and S13 in the segment sequence. A similar displacement occurs with S4 being placed at the beginning of the cursively connect segments S5 to S9 and not consecutive to S8 (where S4 and S8 together also form "ya" medial). As a result, no observation evaluated in a VDHMM based HWR system using the segment sequence illustrated in FIG. 3B will have a segment combination which results in the correct characters. That is, no observation will consist of S11+S14, consist of S12+S13+S15, or consist of S4+S8 that respectively make up the correct characters of the imaged word $X_0$ of FIG. 4A.

Figure 2:
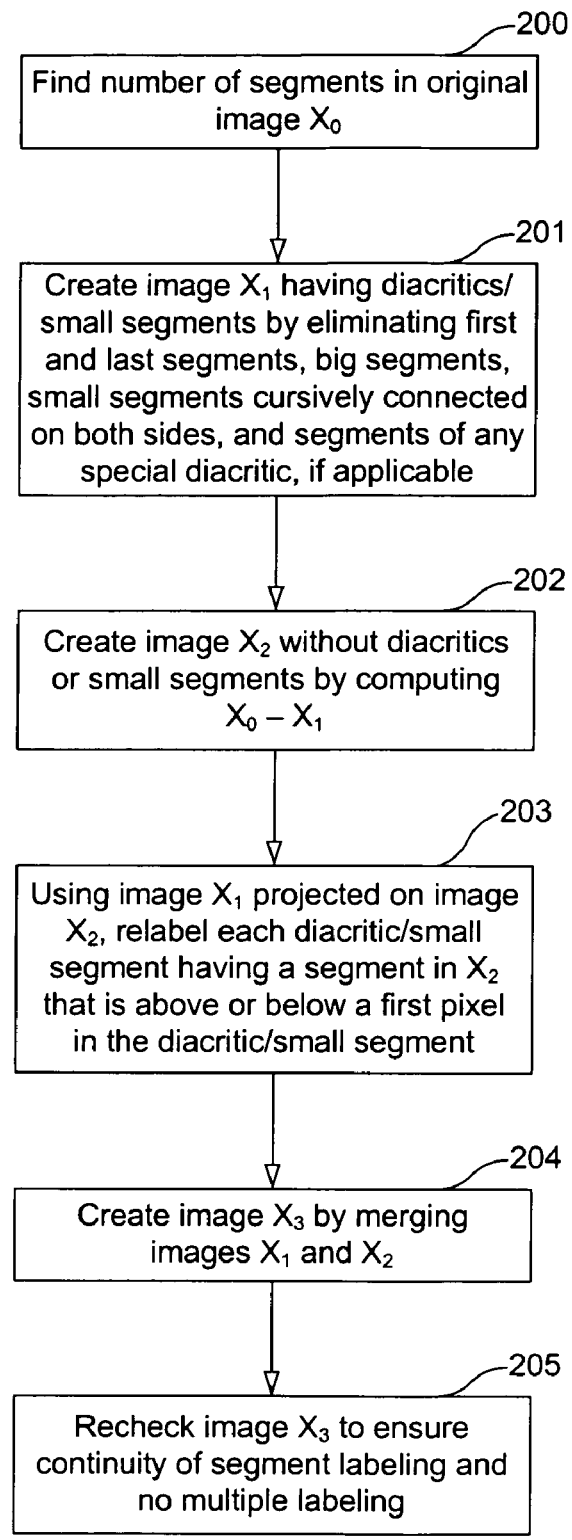
FIG. 2 is a flowchart illustrating steps performed in an exemplary embodiment of an over-segmentation-relabeling algorithm according to the present invention.
Figure 2A:
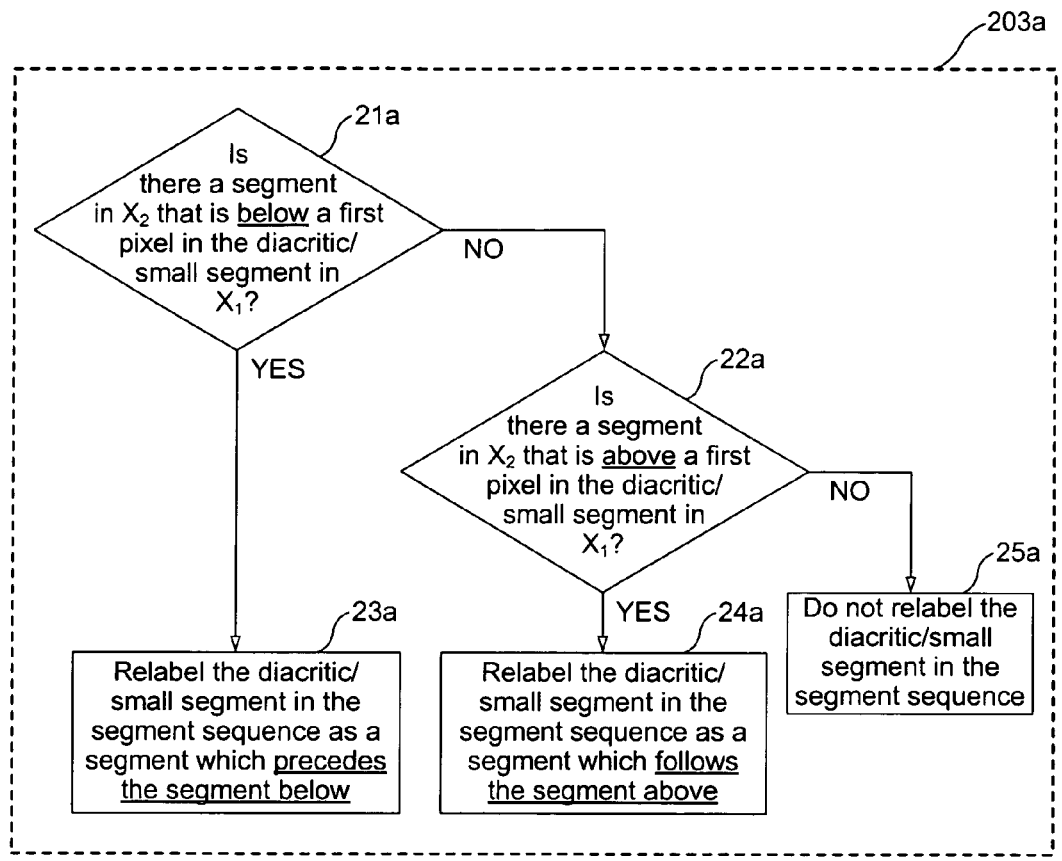
FIG. 2A is a flowchart illustrating steps performed according to an exemplary embodiment of a segment relabeling procedure of step 203a set forth in FIG. 2.
Figure 2B:
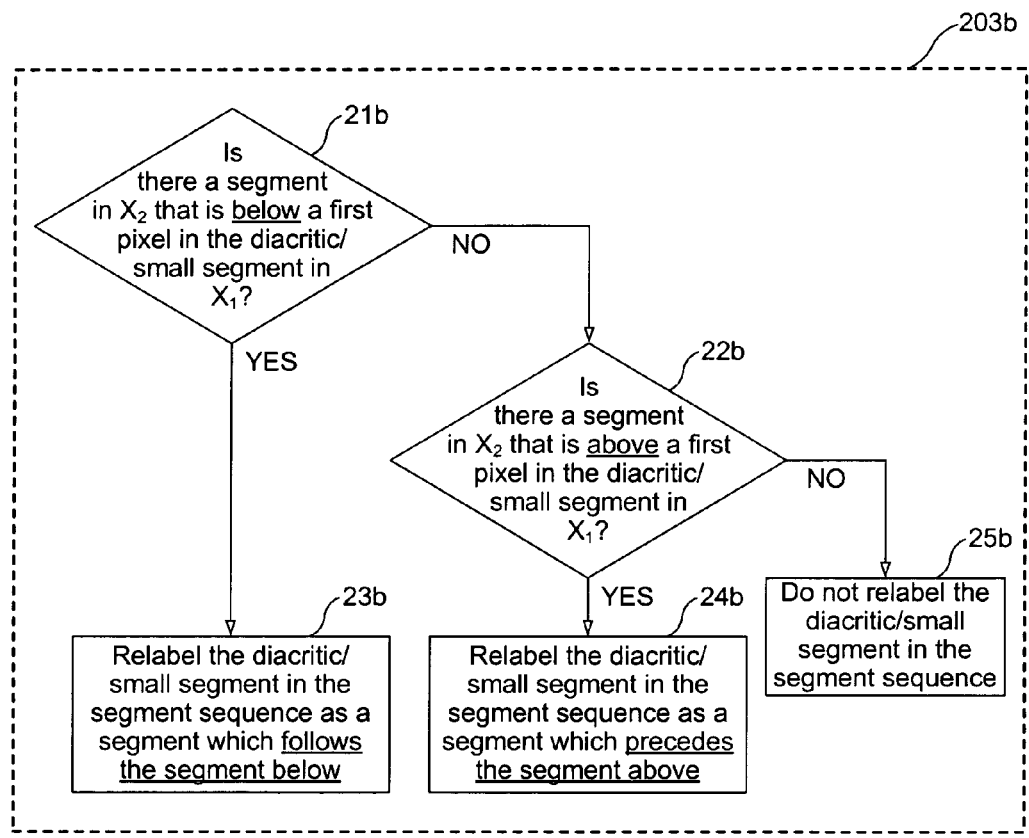
FIG. 2B is a flowchart illustrating steps performed according to an exemplary embodiment of a segment relabeling procedure of step 203b set forth in FIG. 2.

The over-segmentation-relabeling (OSR) algorithm will now be described with reference to FIGS. 2, 2A, and 2B and example imaged words illustrated in FIGS. 3C-3D and 4C-4D. In general, the OSR algorithm relabels these segments displaced by a conventional segmentation algorithm so that these segments immediately precede or follow a segment of the associated main character body. The resulting segment sequence determined by the OSR algorithm may then be used in system 100 to recognize an imaged word $X_0$ (or $T_0$) as having certain character(s). In step 200 of the embodiment of the OSR algorithm presented in FIG. 2, the OSR algorithm finds the number of segments in the original image $X_0$ (or $T_0$). This step may further include finding the first and last segments of the segmented word image. Of course, image $X_0$ may have been subjected to preprocessing, as described above. In step 201, an image $X_1$ is created to include only certain diacritics/small segments (referred to herein as "unsituated segments") by taking image $X_0$ and eliminating the first and last segments, big segments and segments of any special diacritic. The big segments are segments having an X-coordinate or Y-coordinate coverage that exceeds a threshold value. The threshold value may vary depending on the language. For Arabic for example, a threshold value may be between 20 to 60 pixels, and a typical value may be 45 pixels. Moreover, segments that are not considered "big" in terms of its pixel extent, but are flanked on both its left and its right by segmentation points dividing a main body of cursive writing (i.e., "small" segments are cursively connected to a segment on each side) are also eliminated. These eliminated segments are collectively referred to herein as "situated segments," since these segments are not responsible for relabeling. As noted, image $X_1$ is created to include small diacritics. A special diacritic may be for example, a shadda in Arabic, or a double consonant in a Germanic or a Romance language. A shadda may be specially treated as three consecutive small segments. Other special diacritics may be designated as desired based on the particular language applied to system 100.

Figure 3C:
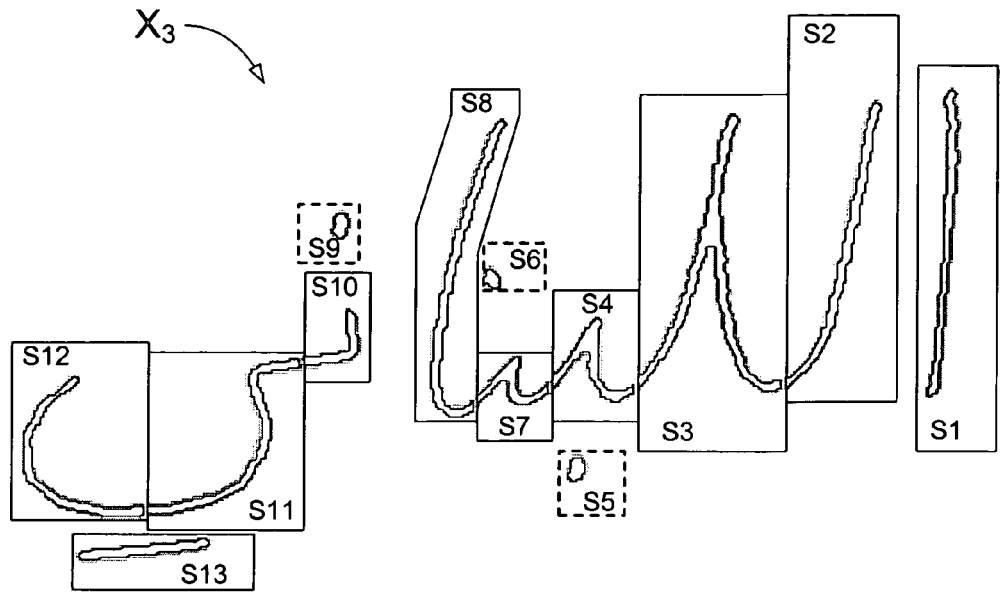
FIG. 3C is an image of the Arabic word shown in FIG. 3A with segmentation points located and the resulting segments sequenced according to an exemplary embodiment of the over-segmentation-relabeling algorithm presented herein.
Figure 3D:
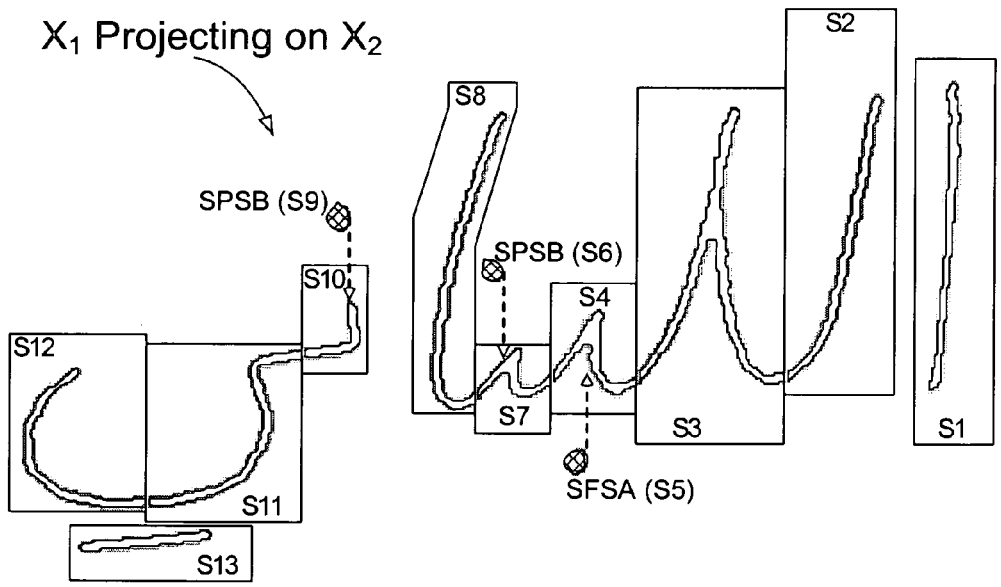
FIG. 3D illustrates a segment relabeling procedure performed on an image $X_1$ of unsituated segments being projected on an image of $X_2$ of situated segments, for the Arabic word shown in FIG. 3A, according to the embodiment of the relabeling procedure outlined in FIG. 2A.
Figure 4C:
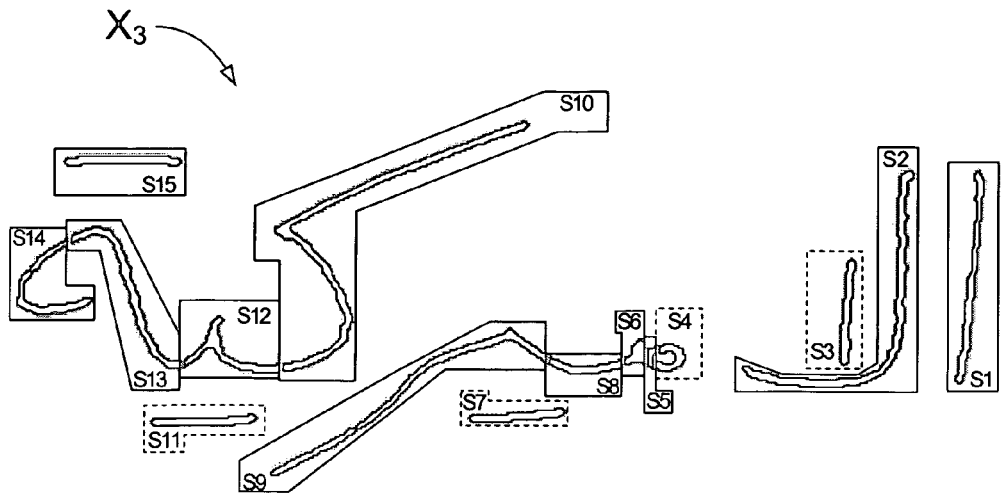
FIG. 4C is an image of the Arabic word shown in FIG. 4A with segmentation points located and the resulting segments sequenced according to an exemplary embodiment of the over-segmentation-relabeling algorithm presented herein.
Figure 4D:
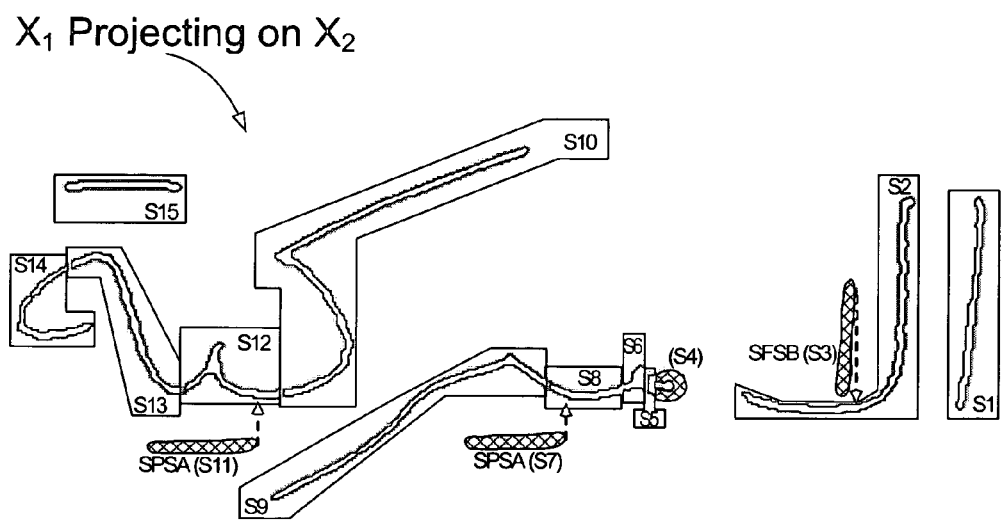
FIG. 4D illustrates a segment relabeling procedure performed on an image $X_1$ of unsituated segments being projected on an image of $X_2$ of situated segments, for the Arabic word shown in FIG. 4A, according to the embodiment of the relabeling procedure outlined in FIG. 2B.

In step 202, an image $X_2$ is created to include only the situated segments. Image $X_2$ may be created, for example, by removing the segments of $X_1$ from original image $X_0$ (i.e., computing $X_0$-$X_1$). In steps 203 and 204 of the OSR algorithm, the sequence of segments is determined. In step 203, in particular, each unsituated segment having a situated segment above or below is relabeled so as to either immediately precede or follow the situated segment in the sequence of segments. In the embodiment of the OSR algorithm presented in FIG. 2, the relabeling of these unsituated segments is performed on image of $X_1$ based on a projection of image $X_1$ on image $X_2$. $X_1$ projecting on $X_2$ is illustrated in FIGS. 3D and 4D for each word image $X_0$ shown in FIGS. 3A and 4A, respectively. In FIGS. 3D and 4D, for illustration purposes only, unsituated segments of image $X_1$ are shown as hatched-filled segments, while the situated segments of image $X_2$ are shown as solid-filled segments. The relabeling procedure illustrated in FIGS. 3D and 4D, further described below, correspond to alternative embodiments of step 203, which are outlined as steps 203a and 203b in FIGS. 2A and 2B, respectively.

In step 203, each unsituated segment (i.e., diacritic or small segment in image $X_1$) is checked for possible relabeling. In general, if a projection of a first pixel of a particular unsituated segment to a segment above or below is found (i.e., there exists a situated segment above or below a first pixel of the particular unsituated segment), then this unsituated segment is relabeled. In one embodiment, step 203 involves step 203a, in which the unsituated segment is relabeled for the segment sequence as either a segment following the segment above or a segment preceding the segment below in image $X_2$. Since a situated segment may exist both above and below a first pixel of the unsituated segment, resulting in two projections to be found, the relabeling procedure of step 203a may be further defined as illustrated in FIG. 2A. In particular, in the embodiment of FIG. 2A, consideration is first given to whether a situated segment is below a first pixel in the unsituated segment (question 21a), and if not, consideration is then given to whether a situated segment is above the first pixel (question 22a). If neither question 21a or 22a are affirmatively answered, then the particular unsituated segment is not relabeled (result 25a). It should be understood, however, that once one segment is relabeled, every segment following the relabeled segment may likewise be "relabeled", so as to ensure continuity of segment placements. If initial question 21a is affirmatively answered, the unsituated segment is relabeled as a segment which precedes the segment below (result 23a). If question 22a yields an affirmative answer, the unsituated segment is relabeled as a segment which follows the segment above (result 24*a*). In another embodiment, the order of questions 21*a* and 22*a* is reversed, such that result 25*b* flows from a negative response to question 21*a* after both 22*a* and 21*a* have been negatively answered.

Step 203*a* is illustrated in FIG. 3D, which represents image $X_1$ projecting on image $X_2$. For each unsituated segment (hatched-filled segments), a projection (illustrated as a dotted arrow) of a first pixel in the segment is found to a segment below, and if none, to a segment above. For example, unsituated segment S5 (as named in FIG. 3C) is identified in image $X_1$ of FIG. 3D as a "segment following the segment above" ("SFSA"), since no projection to a situated segment of image $X_2$ below the first pixel is found, but a projection to a situated segment above exists (i.e., situated segment labeled as S4 in FIG. 3C). In a similar manner, unsituated segment S6 (as labeled in FIG. 3C) is identified in image $X_1$ of FIG. 3D as a "segment preceding the segment below" ("SPSB"), since a projection to a situated segment (labeled as S7 in FIG. 3C) below the first pixel of segment S6 is found. Similarly, unsituated segment (labeled as S9 in FIG. 3C) is identified as a SPSB since a situated segment (labeled as S10 in FIG. 3C) is below. Image $X_3$ illustrated in FIG. 3C is thus formed by merging $X_1$ and $X_2$ and includes the segment sequence resulting from the relabeling procedure performed on image of original segments. The unsituated segments are highlighted using dotted boxes to surround the segment. Thus, for the combination of the situated and unsituated segments sequenced from 1 to 13, segment S5 follows segment S4 above, S6 precedes S7 below, and segment S9 precedes S10 below, and segments S1 and S10, being the first and last segments are not relabeled. In one embodiment of the OSR algorithm, step 205 is included, which involves rechecking image $X_3$ to ensure there exists continuity of segment labeling and no multiple labeling of the same segment.

Alternatively, in another embodiment, step 203 involves step 203*b*, in which each unsituated segment (i.e., diacritic or small segment in image $X_1$) is relabeled for the segment sequence as either a segment preceding the segment above or a segment following the segment below in image $X_2$, if a projection of a first pixel of a particular unsituated segment to a segment above or below is found, respectively. Like step 203*a*, a situated segment may exist both above and below a first pixel of the unsituated segment, resulting in two projections to be found. Thus, the relabeling procedure of step 203*b* may be further defined as illustrated in FIG. 2B. In particular, in the embodiment of FIG. 2B, consideration is first given to whether a situated segment is below a first pixel in the unsituated segment (question 21*b*), and if not, consideration is then given to whether a situatated segment is above the first pixel (question 22*b*). If neither question 21*b* or 22*b* are affirmatively answered, then the particular unsituated segment is not relabeled (result 25*b*). However, if initial question 21*b* is affirmatively answered, the unsituated segment is relabeled as a segment which follows the segment below (result 23*b*). If question 22*b* yields an affirmative answer, the unsituated segment is relabeled as a segment which precedes the segment above (result 24*b*). In another embodiment, the order of questions 21*b* and 22*b* is reversed, such that result 25*b* flows from a negative response to question 21*b* after both 22*b* and 21*b* have been negatively answered.

Step 203*b* is illustrated in FIG. 4D, which represents another image $X_1$ projecting on another image $X_2$ (each image being created from original image $X_0$ of FIG. 4A). For each unsituated segment (hatched-filled segments), a projection (illustrated as a dotted arrow) of a first pixel in the segment is found to a segment below, and if none, to a segment above. For example, unsituated segments S4, (as named in FIG. 4C) is not relabeled as either a "segment following the segment below" ("SFSB") or a "segment preceding the segment above" ("SPSA"), since no projections of the first pixel of segment S4, in $X_1$ to a situated segment below or above in $X_2$ are found. Thus, result 25*b* of FIG. 2B occurs for each of these segments. By contrast, segment S3 (as labeled in FIG. 4C) is identified in $X_1$ as SFSB (result 23*b*), since a projection is found from the first pixel of these segments to situated segment S2 (as labeled in FIG. 4C) below. Note that S5, S6 and S8 are situated segments in image $X_2$ though these segments are small. This is because these segments are cursively connected to a segment on each side (i.e., flanked on both sides by segmentation points dividing cursively connected segments s4 to S9) and are therefore not included in image $X_1$ (see step 201). In a similar manner, segment S7 and S11 (as assigned in FIG. 4C) are identified in $X_1$ as SPSA (result 24*b*), since projections to respective situated segments S8 and S12 (as labeled in FIG. 4C) only above in $X_2$ are found. Image $X_3$ illustrated in FIG. 4C is thus formed by merging $X_1$ and $X_2$ and includes the segment sequence resulting from the relabeling procedure performed on image $X_1$. Thus, for the combination of the situated and unsituated segments sequenced from 1 to 15, segment S3 follows segment S2 below, and segments S7 and S11 precede S8 and S12 above, respectively.

VDHMM Statistics and Recognition

In one embodiment of system 100, a recognition algorithm in step 129 uses VDHMM statistics described below and classifies the imaged word as having a string of one or more characters. A hidden Markov model (HMM) classifier, and in particular, a modified Viterbi algorithm (MVA) adapted to a variable duration hidden Markov model (VDHMM), is used to recover from the whole sequence of observations the optimal, or most likely, letter sequence (i.e., the "hidden" state sequence), and thus the set of correct segmentation points from a superset of over-segmentation points. The recognition algorithm relies on the segment sequence determined by the OSR algorithm to recognize certain segmentation points as being the most likely boundaries between characters. For example, from the segment sequence of example image $X_3$ illustrated in FIG. 3C, the true segmentation points are between S1 and S2, S2 and S3, S3 and S4, S5 and S6, S7 and S8, S8 and S9, and S10 and S11 (the last three segments from S11 to S13 together forming the Arabic letter, in its final form, that corresponds to diagraph "ya"). In the image $X_3$ of FIG. 4D, the true segmentation points are between S1 and S2, S3 and S4, S6 and S7, S8 and S9, S9 and S10, S10 and S11, and S12 and S13 (the last three segments from S13 to S15 together forming the Arabic letter, in its final form, that corresponds to diagraph "teh marbuta"). These segmentation points are sought be recognized by system 100 as the character boundaries so as to output the correct letter sequence as result 135. In one embodiment, the recognition algorithm outputs multiple strings of characters as possible classifications for the imaged word. In one embodiment, 4-10 strings are outputted for the imaged word. Later-described post-processing step 131 may be included in system 100 to hypothesize a set of one or more words from given dictionary 126 which are suggested by the optimal strings(s).

The VHDMM statistics will now be described for an exemplary embodiment of system 100 as applied to the Arabic language, wherein the upper limit of segments making up a character and observations is defined to be four segments. It should be understood that this embodiment is presented as an example and is not intended to limit the present invention in any way. In one embodiment, the discrete state duration probability $P(d_j|q_i)$ is estimated from the training samples $T_0$ with d=1; 2; 3; 4 and i=1; 2; : : : ; 123, because the segmentation algorithm for this embodiment segments each handwritten character into at most 4 segments; and there are 123 distinct characters in the Arabic language. In another embodiment, more or less number of segments per character and more or less number of states can be considered. The HMM may be denoted by a compact notation λ=(Π, A, Γ, B, D). Here, Π stands for a set of initial probabilities, A stands for a set of transition probabilities, B stands for a set of symbol probabilities and D stands for a set of duration probabilities. The last state probability Γ is included in this definition. One could interpret this probability as a transition probability to an imaginary 'final' or 'absorbing' state.

Π, A, Γ, B, and D defined as follows:

$$\Pi = \{\pi_i\}; \pi_i = Pr\{i_1 = q_i\}$$

$$A = \{\alpha_{ij}\}; \alpha_{ij} = Pr\{q_j \text{ at } t+1 | q_i \text{ at } t\}$$

$$\Gamma = \{\gamma_i\}; \gamma_i = Pr\{i_T = q_i\}$$

$$B = \{b_j(O_t^{t+d})\}; O_t^{t+d} = (o_t, o_{t+1} \ldots o_{t+d})$$

$$D = \{P(d|q_i)\}; \quad (1)$$

In the training phase, the VDHMM model parameter □=(□, A, □, B, D) is estimated. These statistics, which are defined in Eq. (1), are computed from two sources: training images and a given dictionary, as initially discussed above with reference to FIG. 1. As described above with reference to FIG. 1, after the segmentation algorithm is executed on the training images T0 (step 111), the state duration probability P(d | qi) is computed (step 114) by counting the number of segments for each character. Extracting the features from each complete character (step 112), which is composed of one or more segments, we are able to estimate the parameters of symbol probability distribution (step 113). The initial state, last state and the state transition probabilities are estimated (step 127) by examining the occurrences of the first character, the last character, and every pair of characters (first-order transitions) for every word in the given dictionary (dictionary 126). The preferred dictionary contains not only the list of legal words for the specified application domain, but also their associated frequencies, i.e., the a priori probability for each word. The precision of these estimation procedures depends on the accuracy and the relevance of the available knowledge sources. If the given dictionary truly reflects the reality of word occurrences in the application domain, the language based probabilities obtained from it are considered to be optimal. If the training images TO cover all the basic writing styles, one can get a good estimate of the state duration and the symbol probabilities based on these images. In real world, however, the information gathering mechanism for both these two sources is not perfect. In a VDHMM based HWR system, on the other hand, the dependence to one particular source of information is balanced against the other since the decision is made after combining these two sources in a sense of adaptive balance. When the word is written ambiguously, the recognition scheme may take most of the advantage from dictionary information. When the system is familiar with the particular writing style, it would like to make the decision relying more on the shape information. This philosophy is similar to human recognition of handwritten words.

State Probabilities

The 123 letters (i.e., distinct characters) of the Arabic alphabet are defined as the states of this exemplary VDHMM. It is therefore straightforward to compute the initial $\pi_i$, transition $\alpha_{ij}$ and last-state $\gamma_j$ probabilities as:

$$\pi_i = \frac{no. \text{ of words beginning with } l(q_i)}{\text{total } no. \text{ of words in the dictionary}} \quad (2)$$

$$a_{ij} = \frac{no. \text{ of transitions from } l(q_i) \text{ to } l(q_j)}{no. \text{ of transitions from } l(q_i)} \quad (3)$$

$$\gamma_j = \frac{no. \text{ of words ended with } l(q_j)}{\text{total } no. \text{ of words in the dictionary}} \quad (4)$$

where "l" stands for "letter" and the function l(·) transforms the state to its representative member of the alphabet. Please note that all these probabilities are derived from the dictionary (shown as dictionary 126 of system 100 in FIG. 1). If the dictionary is changed, these probabilities can be easily recomputed. This capability to adapt to any dictionary makes system 100 highly portable and scalable.

To calculate the state duration probability, the segmentation procedure of step 111 must be performed over all training images $T_0$. Inspecting the segmentation results, the state duration probability $P(d_j|q_i)$ is estimated as $$P(d|q_i) = \frac{no. \text{ of times that letter } (q_i) \text{ is segmented into } d \text{ segments}}{no. \text{ of times that letter } (q_i) \text{ appears}} \quad (5)$$

Because the segmentation algorithm ensures that the maximum duration for each of the 123 states is 4, there are 492 discrete probabilities (=123*4) that must be estimated for state duration. It is possible to estimate these probabilities by inspection and counting of segmented training images $T_0$. This is the discrete form of modeling the state durations, and avoids any a priori assumption about duration distribution.

Symbol Probability Distribution

As noted above, symbol probability may be modeled using a discrete or continuous distribution, wherein the shape information of each character symbol, i.e., feature vector, is modeled either as an independently distributed multivariate discrete distribution or as a mixture Gaussian distribution. In one embodiment, a continuous-discrete hybrid model is used. Continuous and discrete distributions are described below.

Modeling Characters by Continuous Distribution (Continuous Symbol Probability Distribution)

As stated before, symbol probabilities give a statistical measure that a given feature vector (such as that extracted from test image $X_0$) is indicative of a distinct character. Symbol is what is observed. It is matched against all the character models created during training. The matching likelihood, a probability, is the symbol probability. In essence, symbol probability distribution is distribution modeling of characters represented by feature vectors. The most general representation of the pdf is a finite mixture of the form:

$$b_j(x) = \sum_{m=1}^{M_j} c_{jm} \cdot \mathcal{N}[x, \mu_{jm} \cdot U_{jm}], 1 \le j \le N \quad (6)$$

where N represents a Gaussian distribution with mean vector $\mu_{jm}$ and covariance matrix $U_{jm}$ for the $m^{th}$ mixture component in state j, x is the vector being modeled, $M_j$ is the number of Gaussian component N in state j, $c_{jm}$ is the mixture coefficient for the $m^{th}$ Gaussian component in state j. See Rabiner, L. R., "A tutorial on hidden Markov model and selected applications in speech recognition," *Proceeding of IEEE* 77(2):257-286 (1989). The mixture gains satisfy the stochastic constraint $$\sum_{m=1}^{M_j} c_{jm} = 1, 1 \le j \le N \quad (7)$$

$$c_{jm} \ge 0, 1 \le j \le N, i \le m \le M_j$$

so that the PDF is properly normalized, i.e., $$\int_{-\infty}^{\infty} b_j(x)dx = 1, i \le j \le N. \quad (8)$$

Here, each Gaussian distribution in the feature space is expected to represent one among many different writing styles of the characters. So, the first problem is how to estimate the number of Gaussian distributions for each state, i.e., $M_j$ in Eq. (6). For each state, the K-means clustering algorithm with a fixed SNR (signal-to-noise ratio) is used to partition the training samples into several groups, and Mj is equated with the number of groups. The mixture coefficient $c_{jm}$ is then estimated $$c_{jm} = \frac{no. \text{ of training samples in } \mathcal{H}_{jm}}{\text{total } no. \text{ of training samples for state } q_j} \quad (9)$$

where $H_{jm}$ is the set of group m of state $q_j$. Please note, that the $c_{jm}$ in Eq. (9) satisfies Eq. (7) and can be interpreted as the a priori probability of the m-th particular writing style for distinct character letter ($q_j$). And for each group in state $q_j$, the associated parameters for Gaussian distribution are estimated as $$\mu_{jm} = \sum_{x \in \mathcal{H}_{jm}} \frac{1}{N_{jm}} x \quad (10)$$

$$U_{jm} = \sum_{x \in \mathcal{H}_{jm}} \frac{1}{N_{jm}} (x - \mu_{jm})(x - \mu_{jm})^T \quad (11)$$

where x is the feature vector of the training sample, $N_{jm}$ is the no. of samples in $H_{jm}$, and T denotes the matrix transposition. In this implementation, the covariance matrix $U_{jm}$ is assumed to be diagonal, that is, the 35 features are assumed to be independent of each other. Further details of parameter computations can be found in Chen, M.-Y., et al., *IEEE Trans. on Image Processing* 4(12):2-4 (1995)). In the recognition phase, $b_j(O)$, the symbol probability density for observation O can be computed from Eq.(6) by substituting x by O. It is relevant to mention here that the observation O in VDHMM is composed of one or several consecutive segments. From this viewpoint, the symbol probability is modified as $$b_j(o_1 o_2 \ldots o_d) = b_j(O_1^d)^d \quad (12)$$

where $O_1^d$ is the image built by merging segment images $o_1$; $o_2; \ldots; o_d$ together. The power of d in Eq.(12) is used to balance the symbol probability for different number of segments. This is a necessary normalization procedure when every node in the Viterbi net is used to represent a segment.

Modeling Characters by Discrete Distribution (Discrete Symbol Probability Distribution)

First, all N (corresponding to the 45 features in one embodiment) features are assumed to be independent of each other; and each one is modeled as a discrete distribution using WEKA tools (see Ian H. Witten and Eibe Frank (2005) "Data Mining: Practical machine learning tools and techniques", 2nd Edition, Morgan Kauflnann, San Francisco, 2005).

The symbol probability density for observation O can be computed as $$b_j(O) = \prod_{i=1}^{N} P(s_i) \quad (13)$$

Here, $s_i$ is the i-th feature of the observation O. Once again, Eq.(12) is used where $O_1^d$ is the image built by merging segment images $o_1; o_2; \ldots; o_d$ together.

Modeling Characters by Continuous/Discrete Hybrid Distribution (Continuous/Discrete Symbol Probability Distribution)

Here, N features are distributed into two groups, $L_1$ and $L_2$. All features belonging to $L_1$ are distributed using a continuous model given by Eq. (6) and all features belonging to $L_2$ are distributed using a discrete model given by Eq. (13). Two probabilities are multiplied and then normalized by Eq. (12) to compute the symbol probability.

Recognition Using Modified Viterbi Algorithm

Given the aforementioned VDHMM statistics, The objective of the recognition phase is to find the optimal state sequence I* given a sequence of observations O and model parameter λ, i.e., $$I^* = \underset{I}{\operatorname{argmax}}[Pr(I|O, \lambda)] \quad (14)$$

where $$\underset{I}{\max} Pr(I|O, \lambda) = \underset{I}{\max} \frac{Pr(O|I, \lambda)}{Pr(O)} \quad (15)$$

$$= \underset{1 \le i \le N}{\max} \frac{\delta_T(i) \times \gamma(i)}{Pr(O)}$$

and the probability $$\delta_t(j) = \underset{1 \le i \le N}{\max} \left\{ \underset{1 \le d \le D}{\max} \left\{ \delta_{t-d}(i) a_{ij} P(d|q_j) b_j(O_{t-d+1}^t)^d \right\} \right\} \quad (16)$$

Equations (14)-(16) suggest the Viterbi algorithm for finding the best path. Two modified Viterbi algorithms (MVA's), which provide an ordered list of the best L state sequences, are described in Chen, M.-Y., et al. ("Off-line handwritten word recognition using a hidden Markov model type stochastic network," *IEEE Trans. on PAMI* 16(5):481-496 (1994), incorporated herein by reference, may be employed in step 129 of system 100. The first MVA is a parallel version which simply extends the Viterbi net to three dimensional storages where the third dimension represents the choice. On the other hand, the serial version MVA, which searches the (l+1)th globally best path based on the previous l best paths, can be more efficiently programmed on the conventional machine. These two MVA's are adapted to VDHMM's by incorporating the duration probability. The modified Viterbi algorithm for the serial version is described in detail in Chen, M.-Y., et al., *IEEE Trans. on PAMI* 16(5):481-496 (1994)).

Feature Selection

The segment images in handwriting are 2-D binary signals. For selecting good features from such signals, the following criteria are considered useful: (1) Features should be preferably independent of translation and size. To a limited extent, the features should be independent of rotation. (2) Features should be easily computable. (3) Features should be chosen so that they do not replicate each other. These criteria ensure efficient utilization of information content of the feature vector. A comprehensive, cross-lingual feature typology may be used as a starting point, and a set of features for the particular language may be selected from there. Experimental results may be used as the selection criterion to determine whether a selected set of features yields accurate results in the classification stage of the HWR system. A set of feature may vary between 15 and 80 features, depending on the particular language. In one embodiment, between 20 to 60 features are used to define the distinct script characters of a language and are compactly represented by a feature vector. In another embodiment, between 25 and 50 features are used. In another embodiment, a set of 35 features is derived for the definition of the distinct characters, and in another embodiment, a set of 45 features make up a feature vector. The given segment image from which features are to be extracted is first transformed into a binary image with pixels on the object defined as 'black'(1) and the background as 'white'(0). Next, the image may be thinned.

As an example, a set of 45 features include nineteen features useful for describing Arabic handwriting are presented below. It should be understood to one skilled in the art that more or less features may be used to describe Arabic (e.g., 35 features), and that other written languages may be defined by other feature sets, which may include features and weightings particularly suitable for that written language. In this exemplary embodiment for the Arabic language, three moment features that capture the global shape information (i.e., "geometrical moments") may be computed, as well as eleven geometrical and topological features such as loops, X-joint feature, horizontal and vertical zero crossing features, T-joint feature, number of end points in upper, middle and lower zones of the character image, and number of segments in upper, middle and lower zones. Further details regarding these features are described in Chen, M.-Y., et al., *IEEE Trans. on PAMI* 16(5):481-496 (1994)). These features have been widely used in one form or other (and also used under different names) because they are helpful in capturing both the global and local shape information, and are particularly useful in handwriting since they are robust with respect to writing style variation. Since a binary character image can be described by the spatial distribution of its black pixels, twelve pixel distribution features are computed by counting the pixels distribution in every neighboring zone, excluding the cross neighbors. In one embodiment, to compute the pixel distribution features, the segment image is first covered by the minimum rectangle. Then the rectangle is non-uniformly divided into 3×3 zones based on the density of the segment image and the center of gravity. The number of pixels in each coupled zones is counted, and then scaled by the maximum among them.

The following nineteen features are new and found to be very useful for Arabic handwriting.

Two aspect ratio features, $f_{hv}$ and $f_{vh}$, are computed by finding maximum vertical extent (vd) and maximum horizontal extent (hd) of the character.

Feature $f_{hv}$ is based on horizontal to vertical aspect ratio, and feature $f_{vh}$ is based on vertical to horizontal aspect ratio. Maximum values of both features are set to unity.

Four features, $f_{du}$, $f_{dm}$, $f_{dl}$ and $f_{da}$, relating to the number of diacritics or dots in each zone are computed. Each zone contains diacritics (or dots) that are part of the characters. The number of disconnected dots in each zone is computed. Feature $f_{du}$ is based on dots in upper zone, and is defined in the following manner:

$$f_{du} = \begin{cases} 0 & \text{no dot} \\ 0.5 & \text{one dot} \\ 0.75 & \text{two dots} \\ 1.0 & \text{3 or more} \end{cases} \quad (17)$$

Features $f_{dm}$ and $f_{dl}$ may be similarly defined. If any of $f_{du}$, $f_{dm}$ or $f_{dl}$ is non zero, $f_{da}$ is set to 1.0; otherwise it is 0.0.

Eight reference line features relating to the number of diacritics or dots with respect to the baseline of the word (global baseline) and the local baseline of the segment (or segment combination) are computed. The baseline is defined as the horizontal line on which the character sits. One can define $f_{dub}$, standing for "dot feature above baseline," as:

$$f_{dub} \equiv \begin{bmatrix} 0 & \text{no dot above baseline} \\ 0.5 & \text{1 dot above baseline} \\ 0.75 & \text{2 dots above baseline} \\ 1.0 & \text{3 or more above baseline} \end{bmatrix} \quad (18)$$

Similarly, one can define $f_{dlb}$, standing for "dot feature below baseline," as:

$$f_{dlb} \equiv \begin{bmatrix} 0 & \text{no dot below baseline} \\ 0.5 & \text{1 dot below baseline} \\ 0.75 & \text{2 dots below baseline} \\ 1.0 & \text{3 or more below baseline} \end{bmatrix} \quad (19)$$

Similarly, small segments based features, $f_{sub}$ and $f_{slb}$, with respect to baseline are defined as follows:

$$f_{sub} \equiv \begin{bmatrix} 0 & \text{no segment above baseline} \\ 0.5 & \text{1 segment above baseline} \\ 0.75 & \text{2 segments above baseline} \\ 1.0 & \text{3 or more above baseline} \end{bmatrix} \quad (20)$$

$$f_{slb} \equiv \begin{bmatrix} 0 & \text{no segment below baseline} \\ 0.5 & \text{1 segment below baseline} \\ 0.75 & \text{2 segments below baseline} \\ 1.0 & \text{3 or more below baseline} \end{bmatrix} \quad (21)$$

Features computed in Eqs. (18-21) use the global baseline of the word. That is, the baseline of the entire word is used as the baseline of the segment(s) used to compute the feature. One can replace this global baseline by the local baseline of the segment(s) used to compute the feature. Thus, four more features, $f_{dulb}$, $f_{dllb}$, $f_{sulb}$ and $f_{sllb}$ are computed using Eqs. (18-21) but replacing global baseline with local baseline. Other features based on reference lines may be employed, as should be apparent to one skilled in the art.

Two stroke connectedness features, $f_{cr}$ and $f_{cl}$, are defined as follows:

$$f_{cr} = \begin{cases} 1.0 & \text{if segment naturally connected to segment on right} \\ 0.0 & \text{otherwise} \end{cases} \quad (22)$$

$$f_{cl} = \begin{cases} 1.0 & \text{if segment naturally connected to segment on left} \\ 0.0 & \text{otherwise} \end{cases} \quad (23)$$

Two more zero crossing features known as maximum horizontal zero crossing feature, $f_{mzh}$, and maximum vertical zero crossing feature, $f_{mzv}$, are computed. Maximum horizontal zero crossing feature, $f_{mzh}$, is defined as:

$$f_{mzh} = \begin{bmatrix} 0.0 & \text{maximum horizontal } \textit{zerocrossing} \text{ none} \\ 0.25 & \text{maximum horizontal } \textit{zerocrossing} \text{ one} \\ 0.5 & \text{maximum horizontal } \textit{zerocrossings} \text{ two} \\ 0.75 & \text{maximum horizontal } \textit{zerocrossings} \text{ three} \\ 1.0 & \text{otherwise} \end{bmatrix} \quad (24)$$

In a similar manner, maximum vertical zero crossing feature, $f_{mzv}$, is computed by counting maximum number of vertical zero crossing.

For the given character image, three 8-directional chain code based features, $f_{ch}$, $f_{rough}$, and $f_{con}$ are computed. At every bifurcation point, a new chain is initiated. All chains with a length greater than a threshold are considered good chains. Feature $f_{ch}$ is based on chain code, and is defined as:

$$f_{ch} = \begin{cases} 0 & \text{no good chain} \\ 0.25 & \text{one good chain} \\ 0.50 & \text{two good chains} \\ 0.75 & \text{three good chains} \\ 1.0 & \text{4 or more} \end{cases} \quad (25)$$

For the given character image and its 8-directional chain codes, differential chain-codes are computed. In these chain codes, number of non-zero codes is counted, and the ratio of number of non-zero codes to number of codes is computed. This ratio is multiplied by a factor (default=1.25) to give feature $f_{rough}$, chain code based roughness measure of the character.

Furthermore, from differential chain codes, the number of entries that represents a sharp turn (90° or more) is computed, and $f_{con}$, feature based on chain code sharp turn, is defined similarly as $f_{ch}$ as described above.

Observe that all the features are scaled in the range from 0 to 1. The moment features, by virtue of their definition, are also scaled in the same range. Such scaling ensures that no feature gets more or less weight unless otherwise intended.

In another embodiment of recognition phase 120, statistics are used to coarsely group similar-looking distinct characters, and an observation determined to fall within a group is further distinguished from the similar-looking characters using heuristics and linguistic information to identify more subtle characteristic features.

Post-Processing

The output of the Viterbi algorithm in step 129 is not guaranteed to be a legal word from a given dictionary, especially if the corpus of training images $T_0$ is not extensive. Accordingly, system 100 may be supplemented with a post-processing module (step 131), whose objective is to output hypotheses based on the weighted edit distances of MVA output strings to all the dictionary words of given dictionary 126 (or other chosen dictionary), i.e., $$W_j^* = \underset{1 \leq j \leq J}{\arg\max} \left\{ \sum_{l=1}^{L} Pr(W_j | I^{l\text{-}th}) \right\} \quad (26)$$

assuming a J-word dictionary $(W_1, W_2, \ldots W_J)$ and L character strings $(I^{1st} I^{2nd} I^{L\text{-}th})$ from the modified Viterbi algorithm. As the VDHMM gives a rough estimation of the word length, a word-length filter may be used with ±30% of the estimated word length as the filter range to trim the dictionary size. If the estimated word length is less than 6 characters, it may be desirable to have a filter range of ±2 characters of the estimated length. To calculate the edit distance, the error probabilities of insertion, deletion and substitution for a certain letter, or a pair of letters for conditional error probabilities, are estimated in advance. The Levenshtein edit distance function may be used with a custom cost table to calculate the edit distance. The cost table gives the costs for insertion or deletion of a character, or substitution of one character for another. The cost table may be derived from a confusion matrix generated from the symbol probabilities computed from training, or by running the system in recognition mode up through the MVA module using character images as input.

For example, $Pr(W_j | I^{l\text{-}th})$ in Eq.(26) is calculated as $$Pr(W_j | I^{l\text{-}th}) = w^{l\text{-}th} \cdot \min\_edit\_distance(W_j, I^{l\text{-}th}) \quad (27)$$

where $w^{l\text{-}th}$, in one embodiment, is the weight factor for the l-th output of the modified Viterbi algorithm. The normalized path probability associated with state sequence $I^{l\text{-}th}$ may be used as the weight factor $w^{l\text{-}th}$. Alternatively, in another embodiment, $w^{l\text{-}th}$ may be determined from linguistic reasoning and overall character confusion, since once a string is identified in MVA, its probability need not be considered going further as this string is already unmasked or given. Such mutual character confusion information is derived empirically by analyzing the output of the HWR system. The minimum edit distance (min_edit_distance( )) between $W_j$ and $I^{l\text{-}th}$ may be found using the aforementioned Levenshtein algorithm. It should be noted that the use of Levenshtein edit distance is for illustration purpose only. Any other edit distance can be used. For example, the programming approach described in R. A. Wagner and M. J. Fischer, "The string-to-string correction problem," J. ACM 21:168-173 (1974), may be used to find the minimum edit distance as well. If the state sequence $I^{l\text{-}th}$ exactly matches $W_j$ in the given dictionary, that is, min_edit_distance=0, this word is said to be directly recognized as $W_j$. Otherwise, the hypotheses based on the weighted edit distances to all the dictionary words are generated. The simple edit-distance metric could be replaced by more complex analysis based on linguistic knowledge, especially when the observed word involves ambiguous segmentation.

Exemplary Computer System

Figure 5:
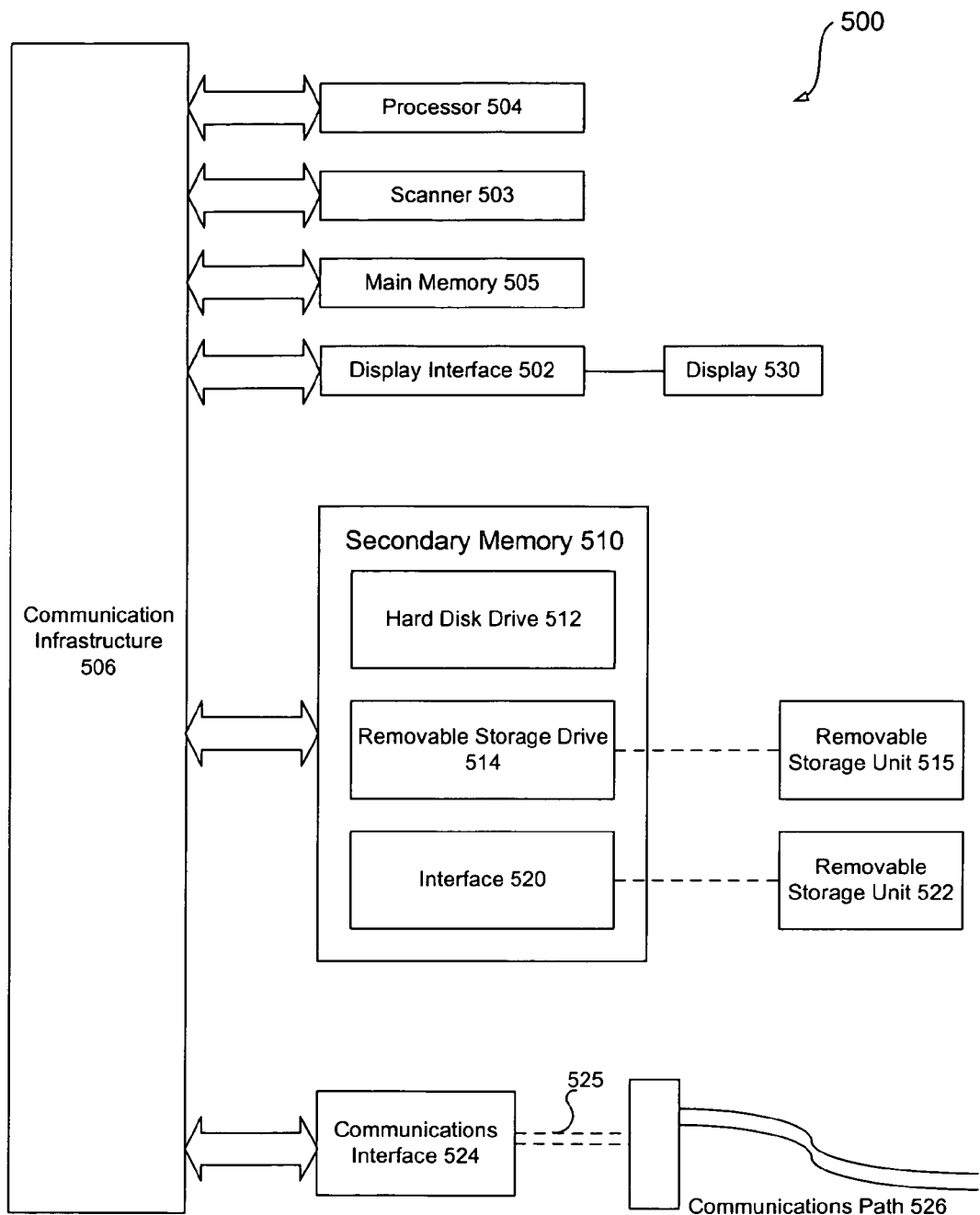
FIG. 5 illustrates an example computer system, in which embodiments of the present invention can be implemented as computer-readable code software.
Figure 6A:
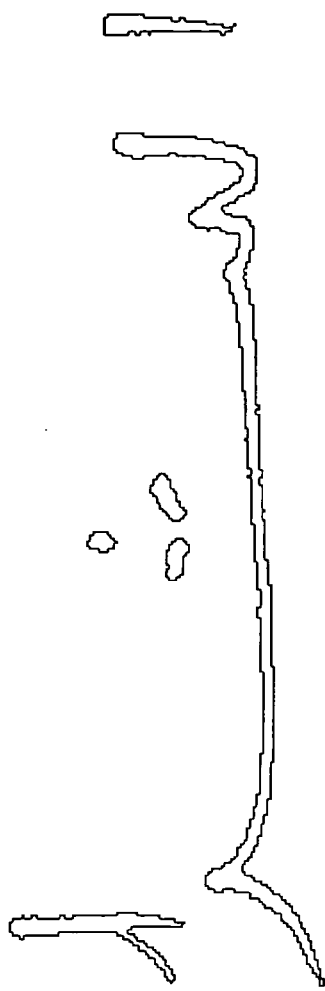
FIG. 6A is an image of a handwritten Arabic word.
Figure 6B:
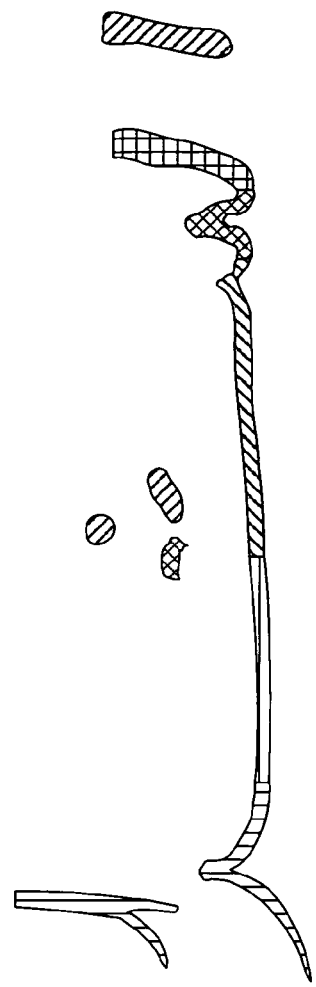
FIG. 6B is a pictorial depiction of over-segmentation of the imaged word shown in FIG. 6A to contain both true and false segmentation points.
Figure 6B:
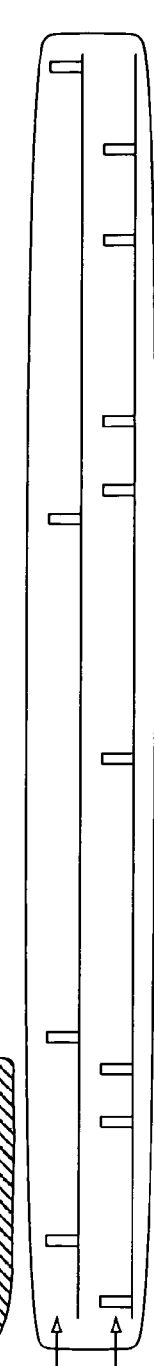

FIG. 5 illustrates an example computer system 500, in which the present invention can be implemented as computer-readable code software. Various embodiments of the invention are described in terms of this example computer system 500. After reading this description, it will become apparent to a person skilled in the relevant art how to implement the invention using other computer systems and/or computer architectures.

FIG. 5 illustrates one or more processors, such as processor 504. Processor 504 can be a special purpose or a general purpose digital signal processor. The processor 504 is connected to a communications infrastructure 506 (for example, a bus or network). Various software implementations are described in terms of this exemplary computer system. After reading this description, it will become apparent to a person skilled in the relevant art how to implement the invention using other computer systems and/or computer architectures.

Computer system 500 can include a display interface 502 that forwards graphics, text (including result 135 as digital text), and other data from the communication infrastructure 506 (or from a frame buffer not shown) for display on the display unit 530. Further, display unit 530 may be an interactive touch screen for on-line image capture of unconstrained handwritten words. The graphics, text, and other data, including off-line handwritten words, may be loaded into computer system 500 by means of a scanner 503.

Computer system 500 also includes a main memory 505, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 515 in a well known manner. Removable storage unit 515, represents a floppy disk, magnetic tape, optical disk, etc. which is read by and written to by removable storage drive 514. As will be appreciated, the removable storage unit 515 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, wired or wireless systems, etc. Software and data transferred via communications interface 524 are in the form of signals 525 which may be electronic, electromagnetic, optical or other signals capable of being received by communications interface 524. These signals 525 are provided to communications interface 524 via a communications path 526. Communications path 526 carries signals 525 and may be implemented using wire or cable, fiber optics, a phone line, a cellular phone link, an RF link and other communications channels.

In this document, the terms "computer program medium" and "computer usable medium" are used to generally refer to media such as removable storage drive 514, a hard disk installed in hard disk drive 512, and signals 525. These computer program products are means for providing software to computer system 500.

Computer programs (also called computer control logic and software) are stored in main memory 505 and/or secondary memory 510. Computer programs may also be received via communications interface 524. Such computer programs, when executed, enable the computer system 500 to implement the present invention as discussed herein. In particular, the computer programs, when executed, enable the processor 504 to implement the processes of the present invention, such as the method(s) implemented as described above. These processes may be performed automatically, or involve some form of manual intervention. Accordingly, such computer programs represent controllers of the computer system 500. Where the invention is implemented using software, the software may be stored in a computer program product and loaded into computer system 500 using removable storage drive 514, hard drive 512 or communications interface 524.

The invention is also directed to computer products (also called computer program products) comprising software stored on any computer useable medium. Such software, when executed in one or more data processing device, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

EXAMPLE

The following example describes an off-line Arabic handwritten word recognition system according to an embodiment of the present invention.

A corpus was assembled consisting of about 74,000 Arabic character images for training symbol probabilities and about 1500 Arabic word images for computing segmentation statistics. An Arabic handwriting corpus was created using multiple handwriting samples of sixty-two Arabic words that cover a majority of Arabic letter glyphs. These 62 words have a high enough frequency so as to be familiar to most native speakers (500 occurrences in the Arabic Gigaword corpus by Graff, D., "Arabic Gigaword," $1^{st}$ ed., Linguistic Data Consortium, Philadelphia (2003) (referred herein as the "Arabic Gigaword corpus"), increasing the likelihood that the respondents will write naturally. Respondents write each word six (6) times on a data collection form, so that multiple variations from the same writer may be captured. The data collection forms were scanned at 300 dpi in black and white, and the word images are separated out of the page images using a series of macros in Adobe Photoshop. Individual character images from these word images are extracted using JCapchar, a software tool developed at The MITRE Corporation. JCapchar is an image annotation tool that allows users to select polygon or rectangular regions from a word-image and identify those regions as a particular character. The tool takes as inputs word-images and word-labels, and outputs character images and character information such as the label, the originating word-image, and the coordinates of its selection. Data from the IFN/ENIT-database (used with permission) provided 26459 Arabic words images (of Tunisian town/village names handwritten by 411 different writers) from which character images were extracted using JCapchar.

State duration probabilities (i.e., segmentation statistics) were estimated from approximately 1500 Arabic training word images. From 74,000 character images extracted for the corpus, the parameters of mixture Gaussian distribution and independently distributed multivariate discrete distribution for symbol probability are estimated. A given dictionary is used to extract the initial state, last state and state transition probabilities. After all these probabilities are obtained, the VDHMM is trained.

To test the system in the recognition phase, the 250 most frequent words from the Arabic Gigaword corpus were used. These 250 word types represent 31% of the Arabic Gigaword corpus tokens. Word images of these words prepared by multiple writers were tested in the recognition phase. This data used for testing is distinct from the training data.

During recognition, an optimal state sequence is obtained for each iteration of the modified Viterbi algorithm described above. If its corresponding letter sequence exists in the given dictionary, this word is said to be the result of direct recognition. After four iterations of the modified Viterbi algorithm, a hypothesis generation scheme will be applied. Each optimal state sequence is compared to each dictionary word using the Levenstein edit-distance function previously mentioned. The top 4 matching dictionary words are proposed as hypotheses.

Both discrete probability modeling and continuous probability modeling for symbol probability were evaluated using a 250-word lexicon and 35 feature vectors. Tables 1 and 2 give the percent of words recognized correctly (i.e., "counts") to the total number of words ran through the HWR system. Although the total number of test words (1630) is more than 250, all these words come from the lexicon of 250 words. That is, a word in the lexicon is written, on average, more than six times. Table 1 gives the results when symbol probabilities are modeled by mixture Gaussian densities. Table 2 gives the results when symbol probabilities are modeled by discrete distribution. If the correct word is included within the top four hypotheses, the word is assumed to be correctly recognized. The results reveal that discrete probability modeling for symbol probability works better than the more complex continuous probability modeling, which is due to the fact that most features used here for Arabic are discrete in nature.

TABLE 1

| Hypothesis | Count | Percent |
|---|---|---|
| 1st | 562 | 34 |
| 2nd | 133 | 8 |
| 3rd | 73 | 4 |
| 4th | 49 | 3 |
| Total | 817 | 50 |

Word Recognition Results for 1630 Words using continuous symbol probability

TABLE 2

| Hypothesis | Count | Percent |
|---|---|---|
| 1st | 667 | 41 |
| 2nd | 129 | 8 |
| 3rd | 68 | 4 |
| 4th | 39 | 2 |
| Total | 903 | 55 |

Word Recognition Results for 1629 Words using discrete symbol probability

Table 3 gives the results when symbol probabilities are modeled by discrete distribution and 45 features are used. In this experiment, 1640 words are used as test words and again a 250-word lexicon is used. The recognition performance has improved by 10% primarily due to 10 additional features used to represent handwriting segments.

TABLE 3

| Hypothesis | Count | Percent |
|---|---|---|
| 1st | 804 | 49 |
| 2nd | 170 | 10 |
| 3rd | 59 | 3.6 |
| 4th | 35 | 2 |
| Total | 1068 | 65 |

Word Recognition Results for 1640 Words using discrete symbol probability

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A method for recognizing unconstrained cursive handwritten words, comprising:

processing an image of a handwritten word of one or more characters, the processing step including segmenting the imaged word into a set of one or more segments and determining a sequence of segments using an over-segmentation-relabeling algorithm;

extracting feature information of one segment or a combination of several consecutive segments;

repeating said extracting step until feature information from segments or combinations thereof have been extracted; and classifying the imaged word as having a string of one or more characters using the extracted feature information, wherein the segmenting the imaged word includes locating a first segment and a last segment in the imaged word, and wherein the determining a sequence of segments using an over-segmentation-relabeling algorithm includes:

characterizing segments as either situated segments or unsituated segments, wherein situated segments include the first and last segments, segments having an X-coordinate or Y-coordinate coverage that exceed a threshold value, and small segments that are cursively connected to segments on each side, and wherein unsituated segments are segments not characterized as situated segments; and placing each unsituated segment having a situated segment above or below so as to either immediately precede or follow the situated segment in the sequence of segments.

2. The method of claim 1, wherein the feature information includes moment features, geometrical and positional information based features, pixel distribution features, topological features, stroke connectedness features, and reference line features.

3. The method of claim 2, wherein the imaged word is an Arabic word and the feature information further includes aspect ratio features, location and number of disconnected dots, and chain code features.

4. The method of claim 1, further comprising:
hypothesizing a set of one or more words from a given dictionary which are suggested by the string of one or more characters determined for the imaged word in the classifying step.

5. An unconstrained cursive character handwritten word recognition system, comprising a processor including:
an image processing module operable to process an image of a handwritten word of one or more characters, wherein the processing of the imaged word includes segmenting the imaged word into a finite number of segments and determining a sequence of the segments using an over-segmentation-relabeling algorithm, wherein each character includes one or more consecutive segments;
a feature extraction module operable to derive a feature vector to represent feature information of one segment or a combination of several consecutive segments; and
a classification module operable to determine an optimal string of one or more characters as composing the imaged word,
wherein the classification module uses a continuous-discrete hybrid probability modeling of features toy determine a final symbol probability of whether a given feature vector is indicative of a given distinct character,
wherein, in the continuous-discrete hybrid probability modeling of N features, the features N are separated into a first group $N_1$ and a second group $N_2$, features of the first group $N_1$ are distributed using a continuous probability model to obtain a continuous distribution probability measure, features of the second group $N_2$, are distributed using a discrete probability model given by equation (1)

$$b_j(O) = \prod_{i=1}^{N_2} P(s_i) \quad (1)$$

wherein, in Equation (1), $b_j(O)$ is the discrete symbol probability distribution of the features of the second group $N_2$ for an observation O composed of the one segment or the combination of several consecutive segments, wherein $P(s_i)$ is the probability of $s_i$, and $s_i$ is the i-th feature of the observation, and
wherein the continuous distribution probability measure and the discrete distribution probability measure $b_j(O)$ are multiplied and normalized to obtain the final symbol probability of whether a given feature vector is indicative of a given distinct character.

6. The handwritten word recognition system of claim 5, wherein the image processing module includes means for slant normalization and noise reduction.

7. The handwritten word recognition system of claim 5, wherein a feature vector is derived for each segment and each combination of two or more consecutive segments.

8. The handwritten word recognition system of claim 5, wherein the over-segmentation-relabeling algorithm segments each character into at most two to seven consecutive segments.

9. The handwritten word recognition system of claim 8, wherein each character of the imaged word is segmented into at most four consecutive segments.

10. The handwritten word recognition system of claim 9, wherein a feature vector is derived for each segment and each combination of two to four consecutive segments.

11. The handwritten word recognition system of claim 5, wherein the feature information of includes moment features, geometrical and positional information based features, pixel distribution features, and reference line features.

12. The handwritten word recognition system of claim 5, wherein the imaged word is an Arabic word.

13. The handwritten word recognition system of claim 12, wherein the feature information includes aspect ratio features, location and number of disconnected dots, stroke connectedness features, and chain code features.

14. The handwritten word recognition system of claim 13, wherein the feature information represented by the feature vector consists of between 25 to 50 features.

15. The handwritten word recognition system of claim 14, wherein the feature information represented by the feature vector consists of 45 features.

16. The handwritten word recognition system of claim 5, wherein a modified Viterbi algorithm is used to determine the optimal string.

17. The handwritten word recognition system of claim 16, wherein the modified Viterbi algorithm is adapted to a variable duration hidden Markov model by incorporating state duration probabilities associated with each distinct character, wherein a state duration probability of a given distinct character represents a probability that the given character has a duration of a defined number of segments.

18. The handwritten word recognition system of claim 5, further comprising:
a post-processing module operable to hypothesize a set of one or more words from a given dictionary which are suggested by the optimal string.

19. The handwritten word recognition system of claim 18, wherein the post-processing module uses the Levenshtein edit distance function with empirically determined weights to hypothesize the set of one or more words.

20. A method for training an unconstrained cursive character handwritten word recognition system, comprising:
processing a corpus of handwritten word images, each imaged word having one or more characters, the processing step including segmenting each of the imaged words into a set of one or more segments and determining a sequence of the segments using an over-segmentation-relabeling algorithm;
extracting feature information of individual characters of the imaged words;
estimating symbol probability parameters associated with each distinct character so as to allow a statistical measure that given feature information is indicative of a distinct character; and
estimating state duration probabilities associated with each distinct character, wherein a state duration probability of a given distinct character represents a probability that a segmented image of the given character will have a duration of a defined number of segments,
wherein the segmenting each imaged word includes locating a first segment and a last segment in the imaged word, wherein the determining a sequence of segments using an over-segmentation-relabeling algorithm includes:
characterizing segments as either situated segments or unsituated segments, wherein situated segments include the first and last segments, segments having an X-coordinate or Y-coordinate coverage that exceed a threshold value, and small segments that are cursively connected to segments on each side, and wherein unsituated segments are segments not characterized as situated segments; and
placing each unsituated segment having a situated segment above or below so as to either immediately precede or follow the situated segment in the sequence of segments:

21. The method of claim 20, wherein the estimating symbol probability parameters step includes calculating representative feature information for each distinct character based on the feature information extracted from character images of a like distinct character in the imaged words.

22. The method of claim 20, wherein the duration of any given character is from one to four segments, and wherein a state duration probability is estimated for each duration of one to four segments for each distinct character.

23. A method for determining a sequence of segments of a segmented image of a cursive written word processed in a word recognition system, comprising:
finding the number of segments, wherein the finding step includes locating a first segment and a last segment in the imaged word; and
determining the sequence of segments using an over-segmentation-relabeling algorithm, wherein the over-segmentation-relabeling algorithm includes:
characterizing segments as either situated segments or unsituated segments, wherein situated segments include the first and last segments, segments having an X-coordinate or Y-coordinate coverage that exceed a threshold value, and small segments that are cursively connected to segments on each side, and wherein unsituated segments are segments not characterized as situated segments; and
placing each unsituated segment having a situated segment above or below so as to either immediately precede or follow the situated segment in the sequence of segments.

24. The method of claim 23, wherein each unsituated segment having a situated segment below is placed so as to immediately follow the situated segment below, and wherein each unsituated segment having a situated segment above but not a situated segment below is placed so as to immediately precede the situated segment above.

25. The method of claim 23, wherein each unsituated segment having a situated segment below is placed so as to immediately precede the situated segment below, and wherein each unsituated segment having a situated segment above but not a situated segment below is placed so as to immediately follow the situated segment above.

26. The method of claim 23, further comprising:
rechecking the segment sequence to ensure continuity of segment placements and no multiple placement of a segment.

27. The method of claim 23, wherein the imaged word has one or more characters, wherein each character of the imaged word is segmented into at most between two to seven segments.

28. The method of claim 23, wherein the situated segments further include any special diacritic present in the imaged word, wherein a special diacritic includes a double consonant or a shadda.

29. A method for recognizing unconstrained cursive handwritten words, comprising:
processing an image of a handwritten Arabic word of one or more characters, the processing step including segmenting the imaged word into a set of one or more segments and determining a sequence of segments using an over-segmentation-relabeling algorithm;
after the processing step, extracting feature information from one segment or a combination of several consecutive segments of the image word processed in the processing step, wherein the feature information includes at least one of aspect ratio features, location and number of disconnected dots, stroke connectedness features and chain code features,
wherein the aspect ratio features include two aspect ratio features, $f_{hv}$ and $f_{vh}$, which are computed by finding maximum vertical extent (vd) and maximum horizontal extent (hd) of the character, wherein feature $f_{hv}$ is based on a horizontal to vertical aspect ratio, and feature $f_{vh}$ is based on a vertical to horizontal aspect ratio,
wherein the location and number of disconnected dots includes three features, $f_{du}$, $f_{dm}$, and $f_{dl}$ relating to the number of disconnected diacritics located in an upper zone, a middle zone, and a lower zone, respectively, of the one segment or the combination of several consecutive segments,
wherein the stroke connectedness features include two stroke connectedness features, $f_{cr}$ and $f_{cl}$,
wherein the chain code features include three 8-directional chain code based features, $f_{ch}$, $f_{rough}$, and $f_{con}$;
repeating said extracting step until feature information from segments or combinations thereof have been extracted; and
classifying the imaged word as having a string of one or more characters using the extracted feature information.

30. The method of claim 29, wherein the feature information includes the aspect ratio features.

31. The method of claim 29, wherein the feature information includes the location and number of disconnected dots.

32. The method of claim 31, wherein the location and number of disconnected dots further includes reference line features relating to the number of diacritics with respect to a global baseline of the imaged word and a local baseline of the one segment or the combination of several consecutive segments.

33. The method of claim 31, wherein the feature information includes the stroke connectedness features.

34. The method of claim 31, wherein the feature information further includes a maximum horizontal zero crossing feature, $f_{mzh}$, and a maximum vertical zero crossing feature, $f_{cr}$ and $f_{mzv}$.

35. The method of claim 31, wherein the feature information includes the chain code based features.

36. An unconstrained cursive character handwritten word recognition system, comprising a processor including:
an image processing module operable to process an image of a handwritten word of one or more characters, wherein the processing of the imaged word includes segmenting the imaged word into a finite number of segments and determining a sequence of the segments using an over-segmentation-relabeling algorithm, wherein each character includes one or more consecutive segments;

a feature extraction module operable to derive a feature vector to represent feature information of one segment or a combination of several consecutive segments;

a classification module operable to determine an optimal string of one or more characters as composing the imaged word; and:

a post-processing module operable to output hypotheses of one or more words from a given dictionary which are suggested by the optimal string, wherein the hypotheses are based on weighted edit distances using weight factors determined from linguistic reasoning and empirically derived mutual character confusion information and without using probabilities given by a modified Viterbi algorithm as a weight factor.

37. The handwritten word recognition system of claim 36, wherein the edit distance function is the Levenshtein edit distance.

38. The handwritten word recognition system of claim 36, wherein the empirically derived mutual character confusion information is derived from a confusion matrix generated from symbol probabilities computed from training the system or by running the system in a recognition mode using character images as input.

39. A non-transitory computer-readable medium having stored thereon, computer readable program code that, if executed by a system, cause the system to perform a method for recognizing unconstrained cursive handwritten words, the method comprising:

processing an image of a handwritten word of one or more characters, the processing step including segmenting the imaged word into a set of one or more segments and determining a sequence of segments using an over-segmentation-relabeling algorithm;

extracting feature information of one segment or a combination of several consecutive segments;

repeating said extracting step until feature information from all segments or combinations thereof have been extracted; and classifying the imaged word as having a string of one or more characters using the extracted feature information, wherein the segmenting the imaged word includes locating a first segment and a last segment in the imaged word, and wherein the determining a sequence of segments using an over-segmentation-relabeling algorithm includes:

characterizing segments as either situated segments or unsituated segments, wherein situated segments include the first and last segments, segments having an X-coordinate or Y-coordinate coverage that exceed a threshold value, and small segments that are cursively connected to segments on each side, and wherein unsituated segments are segments not characterized as situated segments; and placing each unsituated segment having a situated segment above or below so as to either immediately precede or follow the situated segment in the sequence of segments.

40. The computer-readable medium of claim 39, wherein the classifying comprises using a modified Viterbi algorithm to determine the string.

41. The computer-readable medium of claim 40, further comprising:

outputting hypotheses a set of one or more words from a given dictionary which are suggested by the string of one or more characters, wherein the hypotheses are based on weighted edit distances using weight factors determined from linguistic reasoning and empirically derived mutual character confusion information and without using probabilities given by the modified Viterbi algorithm as a weight factor.

42. A non-transitory computer-readable medium having stored thereon, computer readable program code that, if executed by a system, cause the system to perform a method for training an unconstrained cursive character handwritten word recognition system, the method comprising:

processing a corpus of handwritten word images, each imaged word having one or more characters, the processing step including segmenting each of the imaged words into a set of one or more segments and determining a sequence of the segments using an over-segmentation-relabeling algorithm;

extracting feature information of segments where one or more consecutive segments represent individual characters of the imaged words;

estimating symbol probability parameters associated with each distinct character so as to allow a statistical measure that given feature information is indicative of a distinct character; and estimating state duration probabilities associated with each distinct character, wherein a state duration probability of a given distinct character represents a probability that a segmented image of the given character will have a duration of a defined number of segments, wherein the segmenting each imaged word includes locating a first segment and a last segment in the imaged word, wherein the determining a sequence of segments using an over-segmentation-relabeling algorithm includes:

characterizing segments as either situated segments or unsituated segments, wherein situated segments include the first and last segments, segments having an X-coordinate or Y-coordinate coverage that exceed a threshold value, and small segments that are cursively connected to segments on each side, and wherein unsituated segments are segments not characterized as situated segments; and placing each unsituated segment having a situated segment above or below so as to either immediately precede or follow the situated segment in the sequence of segments.

* * * * *

UNITED STATES PATENT AND TRADEMARK OFFICE
CERTIFICATE OF CORRECTION

| | |
|---|---|
| PATENT NO. | : 8,005,294 B2 |
| APPLICATION NO. | : 11/605415 |
| DATED | : August 23, 2011 |
| INVENTOR(S) | : Kundu et al. |

Page 1 of 1

It is certified that error appears in the above-identified patent and that said Letters Patent is hereby corrected as shown below:

IN THE CLAIMS:

In column 25, lines 34-35, claim 5, reading "toy determine" should read --to determine--.

Signed and Sealed this
First Day of November, 2011

David J. Kappos
*Director of the United States Patent and Trademark Office*